(12) United States Patent
Samata et al.

(10) Patent No.: US 12,512,707 B2
(45) Date of Patent: Dec. 30, 2025

(54) MAGNETIC GEAR DEVICE AND ROTATING ELECTRICAL MACHINE

(71) Applicant: Mitsubishi Electric Corporation, Tokyo (JP)

(72) Inventors: Kohei Samata, Tokyo (JP); Takuma Sasai, Tokyo (JP); Norihiko Hana, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 274 days.

(21) Appl. No.: 18/276,448

(22) PCT Filed: Mar. 18, 2021

(86) PCT No.: PCT/JP2021/011132
§ 371 (c)(1),
(2) Date: Aug. 9, 2023

(87) PCT Pub. No.: WO2022/195811
PCT Pub. Date: Sep. 22, 2022

(65) Prior Publication Data
US 2024/0097510 A1    Mar. 21, 2024

(51) Int. Cl.
*H02K 1/18*     (2006.01)
*H02K 16/02*    (2006.01)

(52) U.S. Cl.
CPC ............. *H02K 1/18* (2013.01); *H02K 16/02* (2013.01); *H02K 2201/15* (2013.01)

(58) Field of Classification Search
CPC ........ F16H 49/005; H02K 1/18; H02K 16/02; H02K 2201/15; H02K 49/106
See application file for complete search history.

(56) References Cited

U.S. PATENT DOCUMENTS

2004/0135461 A1    7/2004   Miyake et al.
2004/0145246 A1    7/2004   Nakano et al.
(Continued)

FOREIGN PATENT DOCUMENTS

EP      2 572 440 A2      3/2013
JP      2008-271725 A    11/2008
(Continued)

OTHER PUBLICATIONS

WO-2013186551-A2, all pages (Year: 2013).*
(Continued)

*Primary Examiner* — Naishadh N Desai
(74) *Attorney, Agent, or Firm* — XSENSUS LLP

(57) ABSTRACT

Provided are a magnetic gear device and a rotating electrical machine having intermediate cylindrical portions with increased rigidity against radial-direction external forces. In a magnetic gear device and a rotating electrical machine according to the present disclosure, an intermediate cylindrical portion includes: magnetic-pole portions arranged in a circumferential direction; frame-shaped spacers penetrating in the radial direction, arranged in the circumferential direction alternately with the magnetic-pole portions, and each having two side-wall portions contacting with the adjacent magnetic-pole portions; end plates provided at both ends of the magnetic-pole portions and the spacers in an axial direction of a rotary shaft; and reinforcement portions placed inside the spacers while being pressed to inner surfaces of the side-wall portions in the circumferential direction, to apply forces in the circumferential direction to the adjacent magnetic-pole portions via the spacer.

18 Claims, 13 Drawing Sheets

(56) References Cited

U.S. PATENT DOCUMENTS

| | | | |
|---|---|---|---|
| 2004/0145252 A1 | 7/2004 | Arimitsu et al. | |
| 2008/0296997 A1 | 12/2008 | Bando et al. | |
| 2012/0194021 A1 | 8/2012 | Nakatsugawa et al. | |
| 2016/0087517 A1* | 3/2016 | Powell | H02K 7/1823 |
| | | | 310/103 |

FOREIGN PATENT DOCUMENTS

| | | | |
|---|---|---|---|
| JP | 2008-271726 A | 11/2008 | |
| JP | 2008-289227 A | 11/2008 | |
| JP | 2012-157205 A | 8/2012 | |
| JP | 2016-135014 A | 7/2016 | |
| WO | WO-03084028 A1 * | 10/2003 | H02K 9/197 |
| WO | WO-2013186551 A2 * | 12/2013 | H02K 15/022 |

OTHER PUBLICATIONS

WO-03084028-A1, all pages (Year: 2003).*
International Search Report and Written Opinion mailed on Jun. 8, 2021, received for PCT Application PCT/JP2021/011132, filed on Mar. 18, 2021, 9 pages including English Translation.
Extended European Search Report issued Mar. 26, 2024 in European Patent Application No. 21931560.3, 11 pages.

* cited by examiner

RADIALLY-INNER SIDE ←→ RADIALLY-OUTER SIDE

RADIALLY-INNER SIDE ⟵⟶ RADIALLY-OUTER SIDE

MAGNETIC GEAR DEVICE AND ROTATING ELECTRICAL MACHINE

CROSS-REFERENCE TO RELATED APPLICATION

The present application is based on PCT filing PCT/JP2021/011132, filed Mar. 18, 2021, the entire contents of which are incorporated herein by reference.

TECHNICAL FIELD

The present disclosure relates to a magnetic gear device having a cylindrical shape structure in which a plurality of magnetic-pole portions are arranged in the circumferential direction, and a rotating electrical machine of a magnetic-gear type having a cylindrical shape structure in which a plurality of magnetic-pole portions are arranged in the circumferential direction.

BACKGROUND ART

A magnetic gear device has a triple cylindrical shape structure in which a high-speed rotor as an inner cylindrical portion, a stator as an intermediate cylindrical portion, and a low-speed rotor as an outer cylindrical portion are arranged concentrically around a rotary shaft. The magnetic gear device transmits motive power (rotation torque) between the rotors through magnetic-pole portions provided to the stator as the intermediate cylindrical portion. Each magnetic-pole portion has a structure in which a plurality of sheets of magnetic pole pieces which are magnetic materials are stacked in the axial direction. External forces such as an electromagnetic force and a self-weight act in the radial direction on the magnetic-pole portions of the intermediate cylindrical portion of the magnetic gear device. The magnetic gear device is expected to be applied to a speed increasing gear of a wind power generator or a speed change/reduction gear of an automobile, for example.

A rotating electrical machine of a magnetic-gear type has a triple cylindrical shape structure in which a high-speed rotor as an inner cylindrical portion, a low-speed rotor as an intermediate cylindrical portion, and a stator as an outer cylindrical portion are arranged concentrically around a rotary shaft. When the low-speed rotor is rotated by external motive power, the high-speed rotor rotates at a predetermined speed increase ratio. Through magnetic flux change at the high-speed rotor provided with magnets, output current is generated in a coil of the stator. The intermediate cylindrical portion of the rotating electrical machine is formed by a plurality of magnetic-pole portions arranged in the circumferential direction. Each magnetic-pole portion has a structure in which a plurality of sheets of magnetic pole pieces which are magnetic materials are stacked in the axial direction. External forces such as an electromagnetic force, a self-weight, and a centrifugal force act in the radial direction on the magnetic-pole portions of the intermediate cylindrical portion of the rotating electrical machine. The rotating electrical machine is a rotary machine using an electromagnetic action, and may be called an electric generator or an electric motor.

Patent Document 1 discloses a magnetic wave gear device which is a kind of rotating electrical machine of a magnetic-gear type and in which a nonmagnetic metal rod is provided so as to penetrate, in the axial direction, magnetic pole pieces forming magnetic-pole portions of a low-speed rotor as an intermediate cylindrical portion, thus ensuring the strength of the magnetic pole pieces.

However, in Patent Document 1, the magnetic pole pieces arranged in the circumferential direction are separated from each other and do not form a continuous cylindrical structure in the circumferential direction. Therefore, the low-speed rotor cannot have sufficient rigidity against external forces acting in the radial direction, and thus there is a problem that deformation in the radial direction can occur.

CITATION LIST

Patent Document

Patent Document 1: Japanese Laid-Open Patent Publication No. 2016-135014

SUMMARY OF THE INVENTION

Problems to be Solved by the Invention

The present disclosure has been made to solve the above problem, and an object of the present disclosure is to provide a magnetic gear device and a rotating electrical machine having such an intermediate cylindrical portion structure that can increase rigidity against external forces acting in the radial direction.

Solution to the Problems

A magnetic gear device according to the present disclosure includes: an inner cylindrical portion having a cylindrical shape; an outer cylindrical portion having a cylindrical shape, and provided on a radially-outer side of the inner cylindrical portion and concentrically around a rotary shaft; and an intermediate cylindrical portion having a cylindrical shape, and provided concentrically around the rotary shaft, between the inner cylindrical portion and the outer cylindrical portion. The inner cylindrical portion and the outer cylindrical portion serve as rotors. The intermediate cylindrical portion includes a plurality of magnetic-pole portions arranged in a circumferential direction, spacers having a frame shape and arranged in the circumferential direction alternately with the magnetic-pole portions, each spacer having side-wall portions contacting with the adjacent magnetic-pole portions, end plates provided at both ends of the magnetic-pole portions and the spacers in an axial direction of the rotary shaft, and reinforcement portions placed inside the spacers in a state in which each reinforcement portion is pressed to inner surfaces of the side-wall portions in the circumferential direction, so as to apply forces in the circumferential direction to the adjacent magnetic-pole portions via the spacer.

A rotating electrical machine according to the present disclosure includes: an inner cylindrical portion having a cylindrical shape; an outer cylindrical portion having a cylindrical shape, and provided on a radially-outer side of the inner cylindrical portion and concentrically around a rotary shaft; and an intermediate cylindrical portion provided concentrically around the rotary shaft, between the inner cylindrical portion and the outer cylindrical portion. The inner cylindrical portion serves as a rotor. The outer cylindrical portion serves as a winding-type stator having a plurality of coils. The intermediate cylindrical portion includes a plurality of magnetic-pole portions arranged in a circumferential direction, spacers having a frame shape and arranged in the circumferential direction alternately with the magnetic-pole portions, each spacer having side-wall portions contacting with the adjacent magnetic-pole portions, end plates provided at both ends of the magnetic-pole portions and the spacers in an axial direction of the rotary shaft, and reinforcement portions placed inside the spacers in a state in which each reinforcement portion is pressed to inner surfaces of the side-wall portions in the circumferential direction, so as to apply forces in the circumferential direction to the adjacent magnetic-pole portions via the spacer.

Effect of the Invention

The magnetic gear device according to the present disclosure can increase rigidity against external forces acting in the radial direction, at the intermediate cylindrical portion of the magnetic gear device.

The rotating electrical machine according to the present disclosure can increase rigidity against external forces acting in the radial direction, at the intermediate cylindrical portion of the rotating electrical machine.

DESCRIPTION OF EMBODIMENTS

Figure 1:
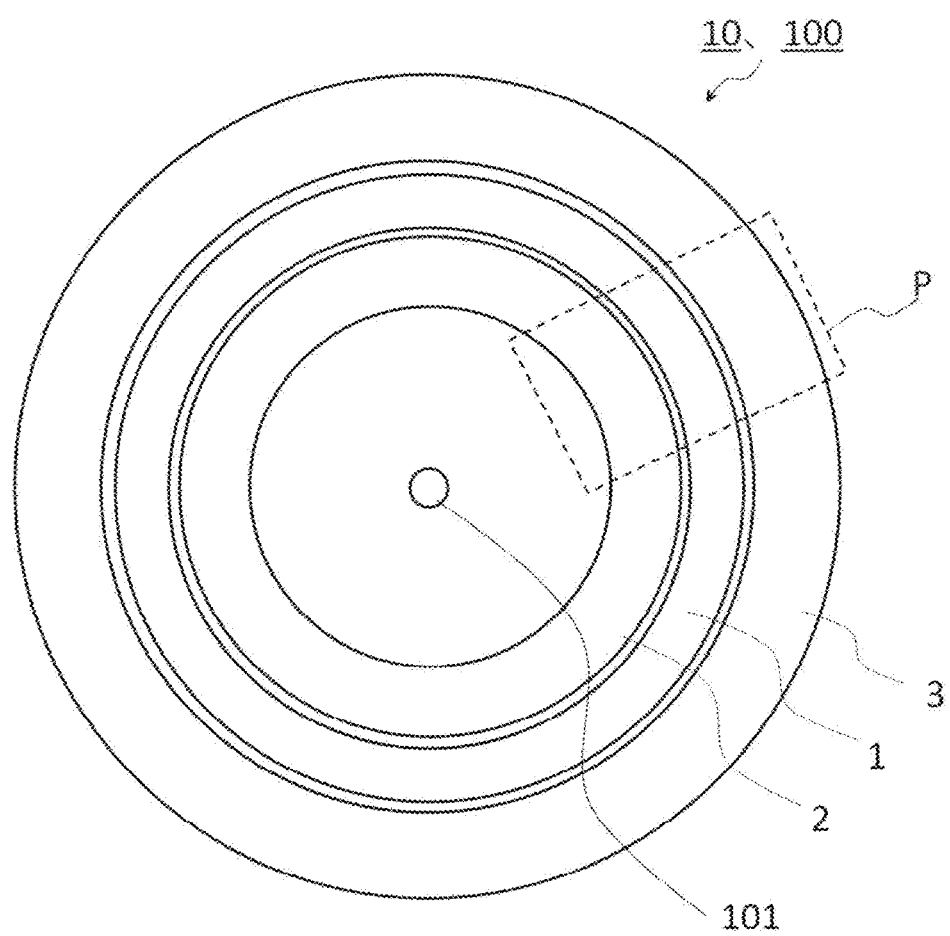
FIG. 1 is a schematic view showing a cross-section of a magnetic gear device and a rotating electrical machine according to embodiment 1 of the present disclosure, as seen in the axial direction.

Hereinafter, embodiments according to the present disclosure will be described with reference to the drawings. In the embodiments below, the same components are denoted by the same reference characters.

Embodiment 1

FIG. 1 is a schematic view showing a cross-section along the radial direction of a magnetic gear device 10 and a rotating electrical machine 100. As shown in FIG. 1, the magnetic gear device 10 and the rotating electrical machine 100 each include an intermediate cylindrical portion 1, an inner cylindrical portion 2, and an outer cylindrical portion 3 which have cylindrical shapes and are arranged concentrically around a rotary shaft 101. The intermediate cylindrical portion 1 is located between the inner cylindrical portion 2 on the radially-inner side and the outer cylindrical portion 3 on the radially-outer side, in the radial direction.

Hereinafter, a general structure of the magnetic gear device 10 and the rotating electrical machine 100 will be described.

In the following description, the axial direction refers to a direction along the rotary shaft 101 of the magnetic gear device 10 and the rotating electrical machine 100. The circumferential direction refers to a direction along the rotation direction of the magnetic gear device 10 and the rotating electrical machine 100. The radial direction refers to a radial direction about the rotary shaft 101. A radially-inner side is a side close to the rotary shaft 101 in the radial direction. A radially-outer side is a side far from the rotary shaft 101 in the radial direction.

Figure 2:
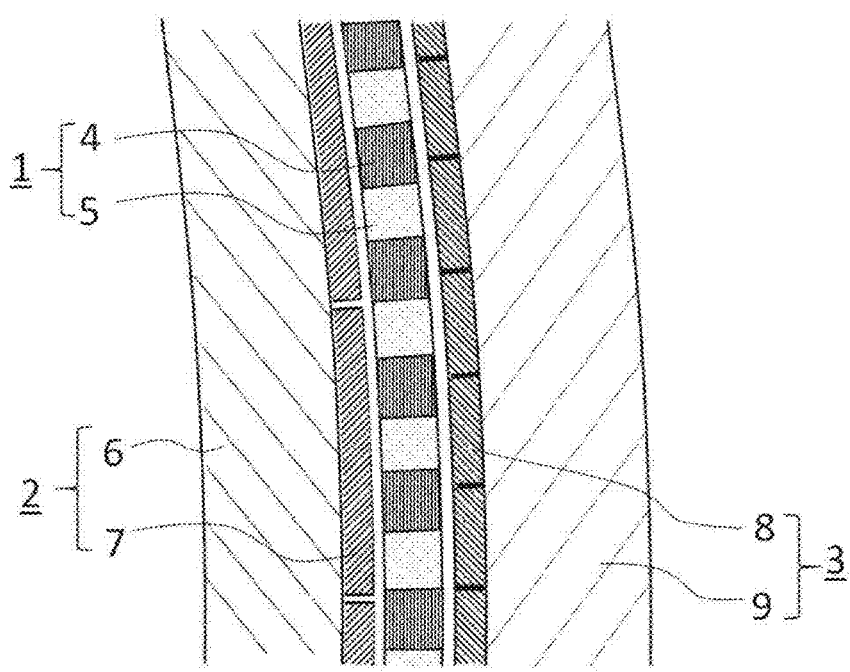
FIG. 2 illustrates a triple cylindrical shape structure of the magnetic gear device according to embodiment 1 of the present disclosure.

FIG. 2 is a schematic view of a specific part of the cross-section of the magnetic gear device 10. In FIG. 2, a part P enclosed by a broken line in FIG. 1 is shown in an enlarged manner.

As shown in FIG. 2, the intermediate cylindrical portion 1 of the magnetic gear device 10 includes magnetic-pole portions 4 and spacers 5 arranged alternately in the circumferential direction. The inner cylindrical portion 2 of the magnetic gear device 10 includes an inner-cylindrical-portion core 6 and inner-cylindrical-portion magnets 7 located on the radially-outer side of the inner-cylindrical-portion core 6. The outer cylindrical portion 3 on the radially-outer side includes outer-cylindrical-portion magnets 8 and an outer-cylindrical-portion core 9 located on the radially-outer side of the outer-cylindrical-portion magnets 8.

In the magnetic gear device 10, the inner cylindrical portion 2 serves as a high-speed rotor, the intermediate cylindrical portion 1 serves as a stator, and the outer cylindrical portion 3 of the magnetic gear device serves as a low-speed rotor.

Figure 3:
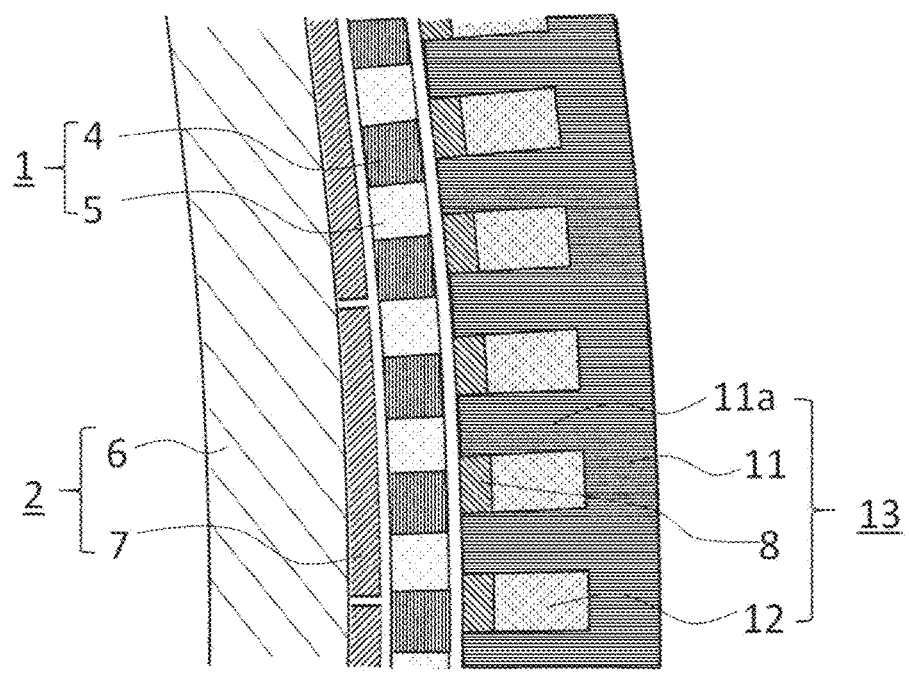
FIG. 3 shows a triple cylindrical shape structure of the rotating electrical machine according to embodiment 1 of the present disclosure.

FIG. 3 is a schematic view showing a specific part of the cross-section of the rotating electrical machine 100. In FIG. 3, the part enclosed by the broken line in FIG. 1 is shown in an enlarged manner. The rotating electrical machine 100 is a rotating electrical machine having a magnetic gear mechanism.

The intermediate cylindrical portion 1 and the inner cylindrical portion 2 of the rotating electrical machine 100 have the same exterior structures as the intermediate cylindrical portion 1 and the inner cylindrical portion 2 of the magnetic gear device 10, and therefore the same reference characters as in FIG. 2 are used. The intermediate cylindrical portion 1 of the rotating electrical machine 100 includes the magnetic-pole portions 4 and the spacers 5 arranged alternately in the circumferential direction. The inner cylindrical portion 2 of the rotating electrical machine 100 includes the inner-cylindrical-portion core 6 and the inner-cylindrical-portion magnets 7 located on the radially-outer side of the inner-cylindrical-portion core 6.

An outer cylindrical portion 13 of the rotating electrical machine 100 includes an outer-cylindrical-portion core 11, core tooth portions 11a protruding from the outer-cylindrical-portion core 11 toward the center, an outer-cylindrical-portion coil 12 wound around the core tooth portions 11a, and the outer-cylindrical-portion magnets 8 arranged in the circumferential direction alternately with the core tooth portions 11a.

The rotating electrical machine 100 is a rotating electrical machine of a magnetic-gear type in which the inner cylindrical portion 2 serves as a high-speed rotor, the intermediate cylindrical portion 1 serves as a low-speed rotor, and the outer cylindrical portion 13 of the rotating electrical machine serves as a winding-type stator.

The intermediate cylindrical portions 1 of the magnetic gear device 10 and the rotating electrical machine 100 according to embodiment 1 have the same structure, and will be described below with reference to the drawings.

Figure 4:
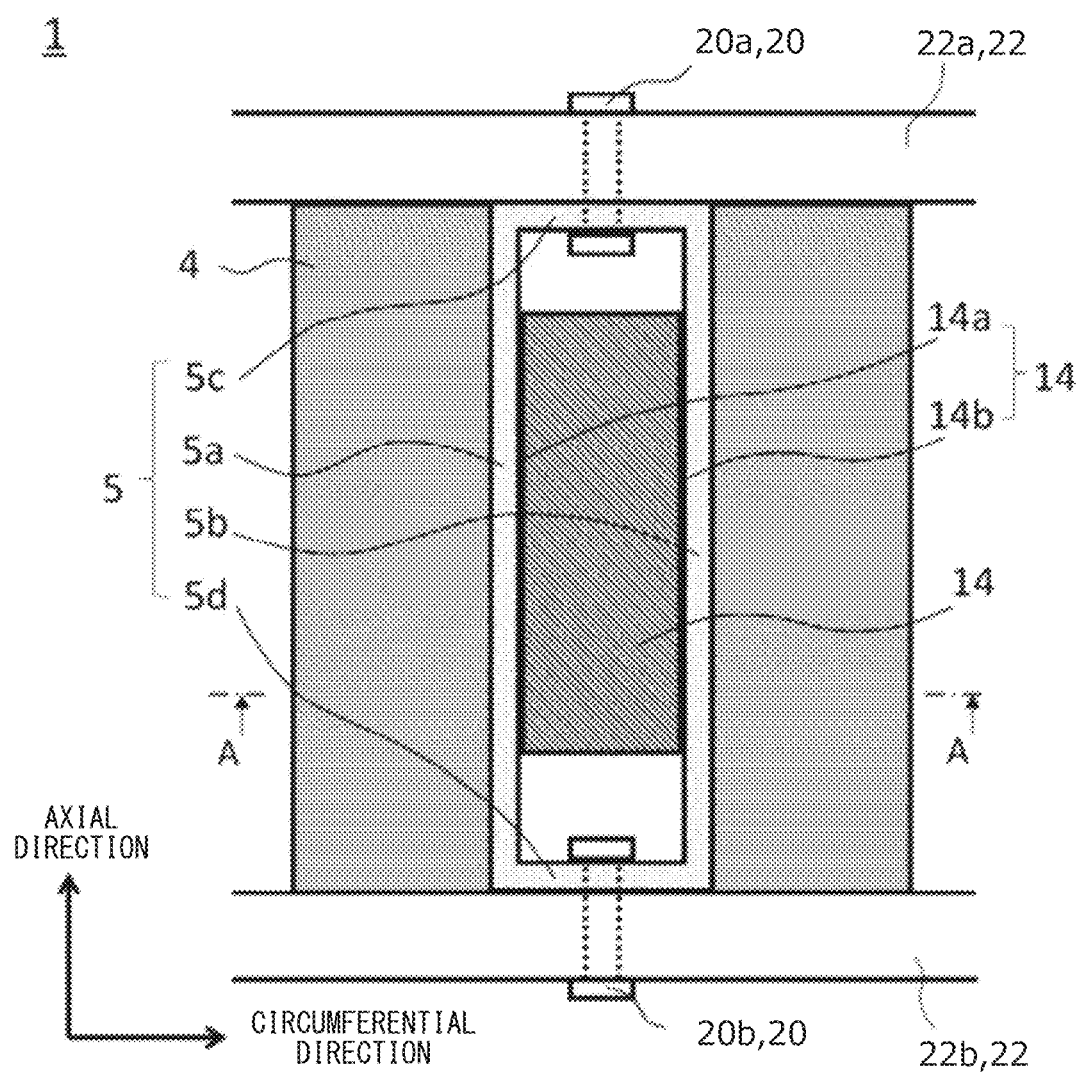
FIG. 4 is a side view of an intermediate cylindrical portion of the magnetic gear device and the rotating electrical machine according to embodiment 1 of the present disclosure, as seen in the radial direction.

FIG. 4 is a side view of a part of the intermediate cylindrical portion 1 as seen in the radial direction. The intermediate cylindrical portion 1 includes the magnetic-pole portions 4 and the spacers 5 arranged alternately in the circumferential direction, reinforcement portions 14 placed in the circumferential direction inside the spacers 5, and two end plates 22 placed at both end portions in the axial direction of the magnetic-pole portions 4 and the spacers 5. The spacers 5 and the end plates 22 are joined by joining members 20.

Each magnetic-pole portion 4 has a structure in which a plurality of sheets of magnetic pole pieces are stacked in the axial direction. The magnetic pole pieces are made from electromagnetic steel sheets, for example. The spacers 5 are each located between the magnetic-pole portions 4 adjacent in the circumferential direction. The magnetic-pole portions 4 and the spacers 5 are arranged in contact with each other without gaps in the circumferential direction.

Each spacer 5 has a frame shape having therein a hollow extending in the radial direction. The spacer 5 has two side-wall portions contacting with the magnetic-pole portions 4 on both sides in the circumferential direction, and two end portions contacting with the end plates 22 in the axial direction. The two side-wall portions of the spacer 5 are a first side-wall portion 5a and a second side-wall portion 5b. The two end portions of the spacer 5 are a first end portion 5c and a second end portion 5d.

That is, the first side-wall portion 5a and the second side-wall portion 5b of the spacer 5 are opposed to each other in the circumferential direction, and the first end portion 5c and the second end portion 5d of the spacer 5 are opposed to each other in the axial direction, thus forming a rectangular frame shape of the spacer 5.

The reinforcement portion 14 is formed by placing, inside the spacer 5, a reinforcement component whose width in the circumferential direction is greater than the width between the inner surfaces of the first side-wall portion 5a and the second side-wall portion 5b of the spacer 5. The reinforcement component has a block shape extending in the circumferential direction.

The reinforcement portion 14 is placed inside the spacer 5 such that a first reinforcement-portion end surface 14a and a second reinforcement-portion end surface 14b which are both end surfaces in the circumferential direction respectively contact with and along the inner surfaces of the first side-wall portion 5a and the second side-wall portion 5b of each spacer 5. In the circumferential direction, contact pressures are generated between contact surfaces of both end surfaces of the reinforcement portion 14 and the side-wall portions of the spacer 5, thereby applying compressive forces in the circumferential direction to the adjacent magnetic-pole portions 4. In other words, the reinforcement portion 14 is the reinforcement component placed in a state of being pressed to the inner surfaces of the side-wall portions in the circumferential direction, and applies forces in the circumferential direction to the adjacent magnetic-pole portions 4 via the spacer 5.

Here, the inner surface of the first side-wall portion 5a is a surface contacting with the first reinforcement-portion end surface 14a, and is a surface opposed in the thickness direction to a surface contacting with the magnetic-pole portion 4 adjacent to the first side-wall portion 5a. The inner surface of the second side-wall portion 5b is a surface contacting with the second reinforcement-portion end surface 14b, and is a surface opposed in the thickness direction to a surface contacting with the magnetic-pole portion 4 adjacent to the second side-wall portion 5b. The inner surface of the first side-wall portion 5a and the inner surface of the second side-wall portion 5b are opposed in the circumferential direction to the inside of the spacer 5.

Figure 5:
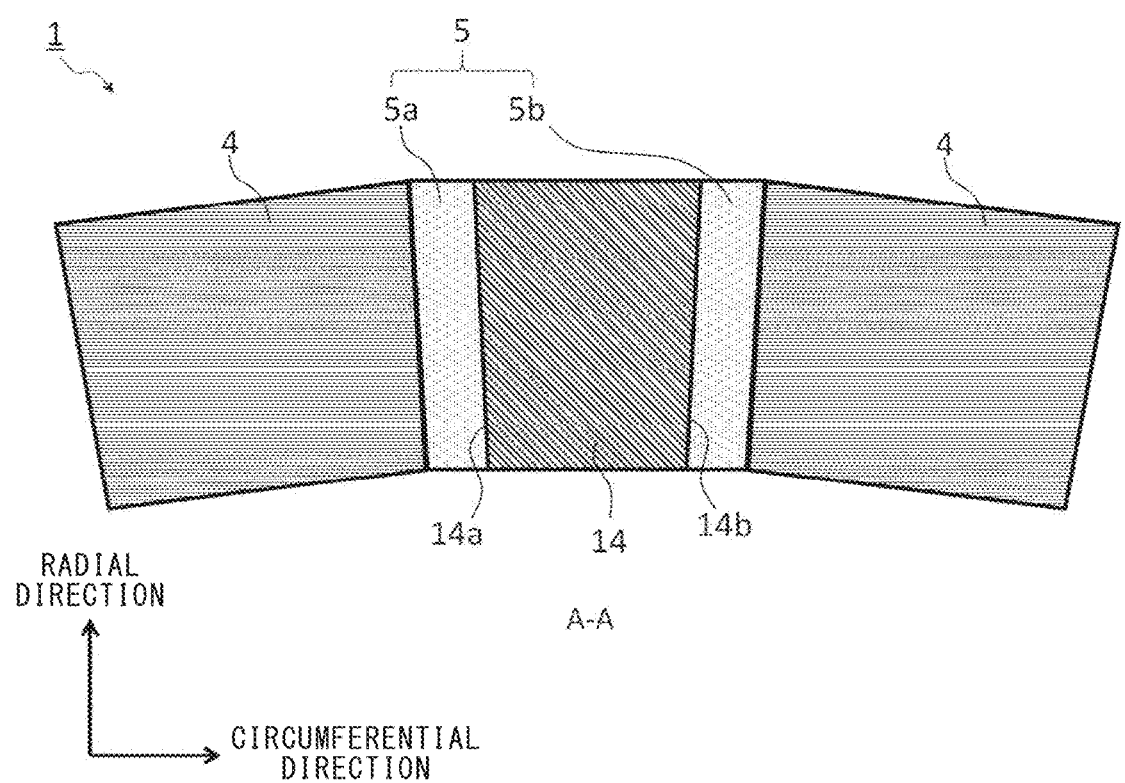
FIG. 5 is a sectional view of the intermediate cylindrical portion of the magnetic gear device and the rotating electrical machine according to embodiment 1 of the present disclosure, as seen in the axial direction.

FIG. 5 is a sectional view of the magnetic-pole portions 4, the spacer 5, and the reinforcement portion 14 of the intermediate cylindrical portion 1 as seen in the axial direction. In FIG. 5, a cross-section along line A-A in FIG. 4 is shown.

As shown in FIG. 5, the cross-sections of the spacer 5 and the reinforcement portion 14 as seen in the axial direction each have a trapezoidal shape in which the width in the circumferential direction gradually increases toward the radially-outer side in the radial direction. In the circumferential direction, the outer surfaces contacting with the magnetic-pole portions 4 on both sides of the spacer 5, the inner surfaces contacting with the reinforcement portion 14, and both end surfaces of the reinforcement portion 14, are formed along the radial direction. In the radial direction, both end surfaces in the circumferential direction of the reinforcement portion 14 and the inner surfaces of the two side-wall portions of the spacer 5 have the same length. Both end surfaces in the circumferential direction of the reinforcement portion 14 contact with the inner surfaces of the two side-wall portions of the spacer 5 without gaps therebetween. Thus, the compressive forces in the circumferential direction can act uniformly on the magnetic-pole portions 4.

The reinforcement portion 14 is placed inside the frame of the spacer 5, with gaps from both end portions in the axial direction of the spacer 5. The length in the axial direction of the reinforcement portion 14 is smaller than the length between the inner surfaces of the first end portion 5c and the second end portion 5d of the spacer 5. In the axial direction, the reinforcement portion 14 is placed with gaps from the inner surfaces of the first end portion 5c and the second end portion 5d of the spacer 5.

The end plates 22 are a first end plate 22a and a second end plate 22b respectively provided on the upper and lower sides in the axial direction. The joining members 20 are a joining member 20a and a joining member 20b respectively provided on the upper and lower sides in the axial direction.

As shown in FIG. 4, regarding the spacer 5, the first end portion 5c which is one end portion in the axial direction is joined to the first end plate 22a by the joining member 20a, and the second end portion 5d which is another end portion is joined to the second end plate 22b by the joining member 20b. The joining may be made by bolt fastening or welding, for example.

In the axial direction, the length of the spacer 5 is smaller than the length of the magnetic-pole portion 4. Thus, the spacer 5 is joined to the first end plate 22a and the second end plate 22b at both ends in the axial direction in a state in which the spacer 5 is subjected to a tensile force in the axial direction.

The magnetic-pole portion 4 is subjected to a compressive force in the axial direction by the first end plate 22a and the second end plate 22b. The first end plate 22a and the second end plate 22b have rigidities necessary for propagating the tensile force in the axial direction of the spacer 5 as the compressive force to the magnetic-pole portion 4. The first end plate 22a and the second end plate 22b are ensured to have such necessary rigidities by setting of the thicknesses in the axial direction of the end plates, the Young's modulus of the material used for the end plates, or the like. The length difference between the spacer 5 and the magnetic-pole portion 4 in the axial direction is set at such a value that the spacer 5 is not plastically deformed by the tensile force based on joining with the end plates 22.

As described above, each magnetic-pole portion 4 is subjected to the compressive force in the axial direction and the compressive force in the circumferential direction. Since the spacer 5 has the frame shape having therein a hollow extending in the radial direction, it becomes easy to perform joining with the end plates 22 in the axial direction and place the reinforcement portion 14 inside the frame, and it becomes possible to apply the compressive forces in the axial direction and the circumferential direction to the magnetic-pole portion 4.

While having a structure in which the magnetic-pole portions 4 and the spacers 5 are arranged alternately in the circumferential direction, the intermediate cylindrical portion 1 is formed in an approximately annular shape with all parts joined integrally. Thus, the intermediate cylindrical portion 1 can convert a force acting in the radial direction to a force in the circumferential direction, so that the intermediate cylindrical portion 1 is less likely to be elastically deformed even when being subjected to external forces. That is, the intermediate cylindrical portion 1 has increased rigidity against external forces acting in the radial direction.

Next, an assembly procedure for the intermediate cylindrical portion 1 of the magnetic gear device 10 and the rotating electrical machine 100 according to embodiment 1 will be described.

First, the end plate 22 is joined to ends on one side in the axial direction of all the spacers 5. For example, first, the second end portions 5d of the spacers 5 and the second end plate 22b are joined using the joining members 20b.

Next, the magnetic-pole portions 4 formed by stacking magnetic pole pieces are each arranged between the adjacent spacers 5. At this time, the magnetic-pole portions 4 and the spacers 5 are arranged without gaps in the circumferential direction, but contact pressures may or may not be generated between the contact surfaces of the magnetic-pole portions 4 and the spacers 5.

Next, in a state in which the spacers 5 are subjected to a tensile force, the other end plate 22 is joined to the other ends in the axial direction of all the spacers 5. For example, correspondingly to the above joining state, the first end portions 5c of the spacers 5 and the first end plates 22a are joined by the joining members 20a. Next, the reinforcement portion 14 is placed inside each spacer 5. The reinforcement portion 14 is placed by being press-fitted into the frame of the spacer 5 so that the first reinforcement-portion end surface 14a of the reinforcement portion 14 and the first side-wall portion 5a of the spacer 5 contact with each other and the second reinforcement-portion end surface 14b and the second side-wall portion 5b contact with each other.

The step of joining the other end plate 22 to the other ends of the spacers 5 may be performed after the reinforcement portion 14 is placed inside each spacer 5. In the axial direction, the reinforcement portion 14 is placed with gaps from the spacer 5, and therefore placing the reinforcement portion 14 does not influence joining between the spacer 5 and the end plate 22.

The materials used for the spacer 5, the end plate 22, and the reinforcement portion 14 are nonmagnetic materials such as resin or stainless steel, so as not to obstruct a magnetic flux. The joining members 20 used for joining between the end plates 22 and the spacers 5 are made of a nonmagnetic material. For example, in a case of using bolts, it is desirable that the bolts are made of a nonmagnetic material.

The magnetic gear device according to embodiment 1 can increase rigidity against external forces acting in the radial direction on the intermediate cylindrical portion of the magnetic gear device.

The rotating electrical machine according to embodiment 1 can increase rigidity against external forces acting in the radial direction on the intermediate cylindrical portion of the rotating electrical machine.

Embodiment 2

In embodiment 2, the same components as those in embodiment 1 of the present disclosure are denoted by the same reference characters, and description of the same or corresponding parts is omitted. Hereinafter, with reference to the drawings, a magnetic gear device and a rotating electrical machine according to embodiment 2 will be described.

Figure 6:
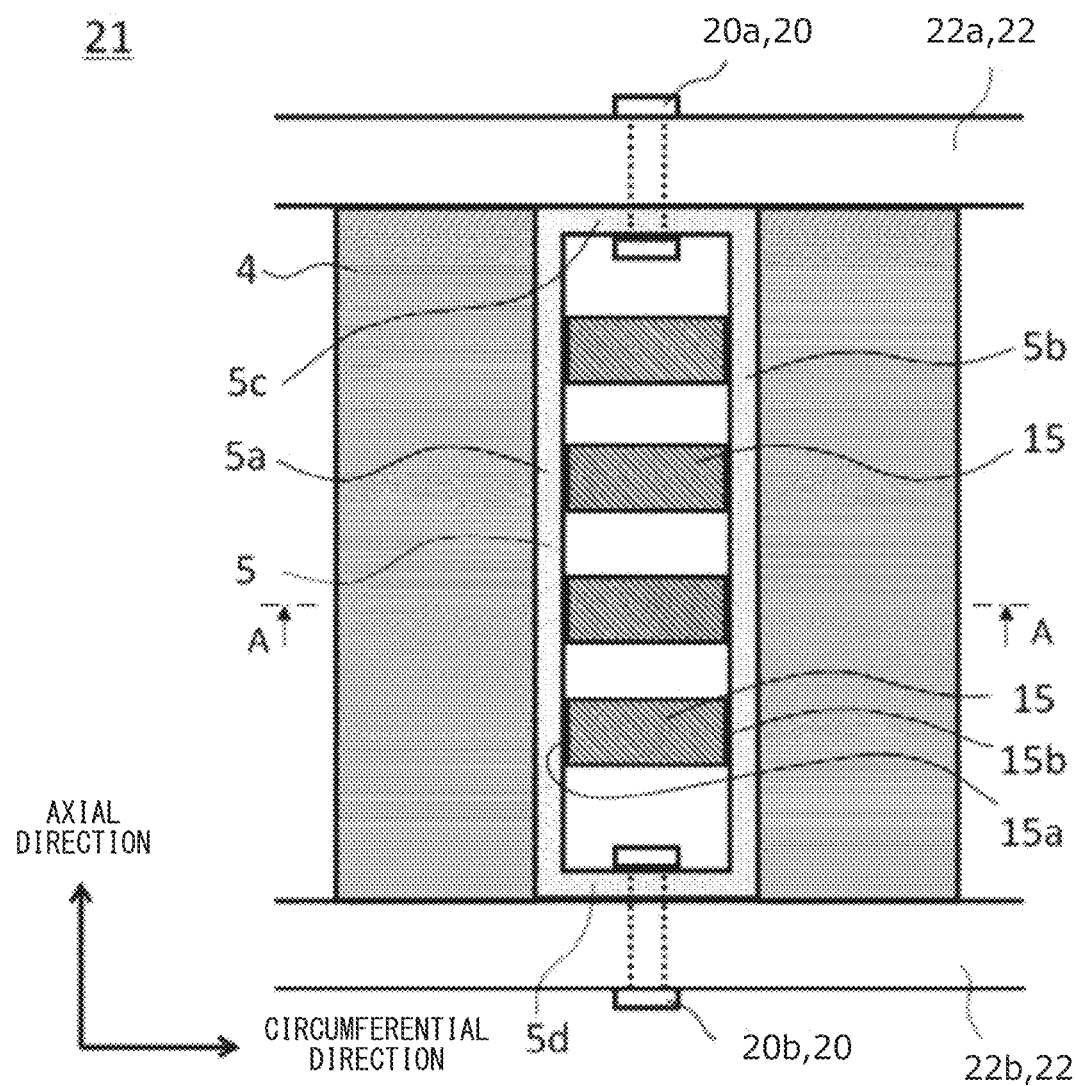
FIG. 6 is a side view of an intermediate cylindrical portion of a magnetic gear device or a rotating electrical machine according to embodiment 2 of the present disclosure, as seen in the radial direction.

FIG. 6 is a side view of a part of an intermediate cylindrical portion 21 of the magnetic gear device or the rotating electrical machine according to embodiment 2, as seen in the radial direction. The intermediate cylindrical portion 21 includes the magnetic-pole portions 4 and the spacers 5 arranged alternately in the circumferential direction, reinforcement portions 15 extending in the circumferential direction inside the spacers 5, and the two end plates 22 placed at both end portions in the axial direction of the magnetic-pole portions 4 and the spacers 5. The spacers 5 and the end plates 22 are joined by the joining members 20.

Difference from embodiment 1 is that, in the intermediate cylindrical portion 1 in embodiment 1, one block-shaped reinforcement portion 14 is placed inside each spacer 5, whereas in the intermediate cylindrical portion 21 in embodiment 2, a plurality of reinforcement portions 15 are placed inside each spacer 5.

As shown in FIG. 6, in the intermediate cylindrical portion 21, a plurality of reinforcement portions 15 are arranged in the axial direction inside each spacer 5.

Each reinforcement portion 15 is formed by placing, inside the spacer 5, a reinforcement component whose width in the circumferential direction is greater than the width between the inner surfaces of the first side-wall portion 5a and the second side-wall portion 5b of the spacer 5. The reinforcement component has a block shape extending in the circumferential direction.

Each reinforcement portion 15 is placed inside the spacer 5 such that a first reinforcement-portion end surface 15a and a second reinforcement-portion end surface 15b which are both end surfaces in the circumferential direction respectively contact with and along the inner surfaces of the first side-wall portion 5a and the second side-wall portion 5b of the spacer 5. In the circumferential direction, contact pressures are generated between contact surfaces of both end surfaces of each reinforcement portion 15 and the side-wall portions of the spacer 5, thereby applying compressive forces in the circumferential direction to the adjacent magnetic-pole portions 4. In other words, the reinforcement portions 15 are reinforcement components placed in a state of being pressed to the inner surfaces of the side-wall portions in the circumferential direction, and apply forces in the circumferential direction to the adjacent magnetic-pole portions 4 via the spacer 5.

A structure in a cross-section of the intermediate cylindrical portion 21 as seen in the axial direction, i.e., a cross section along line A-A in FIG. 6, is the same as that shown in the sectional view in FIG. 5. The reinforcement portion 14 in the sectional view shown in FIG. 5 corresponds to the reinforcement portion 15 of the intermediate cylindrical portion 21.

Also in the intermediate cylindrical portion 21, the spacer 5 and the reinforcement portion 15 each have a trapezoidal shape in which the width in the circumferential direction gradually increases toward the radially-outer side in the radial direction. In the circumferential direction, both end surfaces of the reinforcement portion 15 are formed along the shapes of the inner surfaces of the side-wall portions on both sides of the spacer 5. In the radial direction, both end surfaces in the circumferential direction of the reinforcement portion 15 and the inner surfaces of the two side-wall portions of the spacer 5 have the same length. Both end surfaces in the circumferential direction of the reinforcement portion 15 contact with the inner surfaces of the two side-wall portions of the spacer 5 without gaps therebetween. Thus, the compressive forces in the circumferential direction can act uniformly on the magnetic-pole portions 4.

In the intermediate cylindrical portion 21, one or more reinforcement portions 15 are placed in the axial direction inside the frame of the spacer 5. Therefore, as compared to a case of providing only one reinforcement portion, the compressive forces in the circumferential direction acting on the magnetic-pole portions 4 can have better uniformity in the axial direction.

In the axial direction, the reinforcement portions 15 are placed inside the frame of the spacer 5, with gaps between the reinforcement portions 15 and with gaps from both end portions in the axial direction of the spacer 5. The reinforcement portion 15 placed on the first end portion 5c side of the spacer 5 is provided with a gap from the inner surface of the first end portion 5c. The reinforcement portion 15 placed on the second end portion 5d side of the spacer 5 is provided with a gap from the inner surface of the second end portion 5d.

Also in embodiment 2, owing to joining between the spacers 5 and the end plates 22, the magnetic-pole portions 4 are subjected to compressive forces in the axial direction.

As described above, the magnetic-pole portions 4 are subjected to compressive forces in the axial direction and compressive forces in the circumferential direction, and the intermediate cylindrical portion 21 is formed in an approximately annular shape with all parts joined integrally. Thus, the intermediate cylindrical portion 21 has increased rigidity against external forces acting in the radial direction.

Next, an assembly procedure for the intermediate cylindrical portion 21 of the magnetic gear device and the rotating electrical machine according to embodiment 2 will be described.

Difference from embodiment 1 is that a plurality of reinforcement portions 15 are placed inside each spacer 5. The plurality of reinforcement portions 15 are placed by being press-fitted into the frame of each spacer 5 so that the first reinforcement-portion end surface 15a of each reinforcement portion 15 and the first side-wall portion 5a of the spacer 5 contact with each other and the second reinforcement-portion end surface 15b and the second side-wall portion 5b contact with each other.

The step of joining the other end plate 22 to the other ends of the spacers 5 may be performed after the plurality of reinforcement portions 15 are placed inside the frame of each spacer 5. In the axial direction, there are gaps between the reinforcement portions 15 and the spacer 5, and therefore joining between the spacer 5 and the end plate 22 is not influenced.

The material used for the reinforcement portion 15 is also a nonmagnetic material such as resin or stainless steel, so as not to obstruct a magnetic flux.

The magnetic gear device according to embodiment 2 provides the same effects as in embodiment 1. Further, in the intermediate cylindrical portion of the magnetic gear device according to embodiment 2, since a plurality of reinforcement portions are placed in the axial direction inside the frame of each spacer, the compressive forces acting in the circumferential direction can have better uniformity in the axial direction.

The rotating electrical machine according to embodiment 2 provides the same effects as in embodiment 1. Further, in the intermediate cylindrical portion of the rotating electrical machine according to embodiment 2, since a plurality of reinforcement portions are placed in the axial direction inside the frame of each spacer, the compressive forces acting in the circumferential direction can have better uniformity in the axial direction.

Embodiment 3

In embodiment 3, the same components as those in embodiment 1 of the present disclosure are denoted by the same reference characters, and description of the same or corresponding parts is omitted. Hereinafter, with reference to the drawings, a magnetic gear device and a rotating electrical machine according to embodiment 3 will be described.

Figure 7:
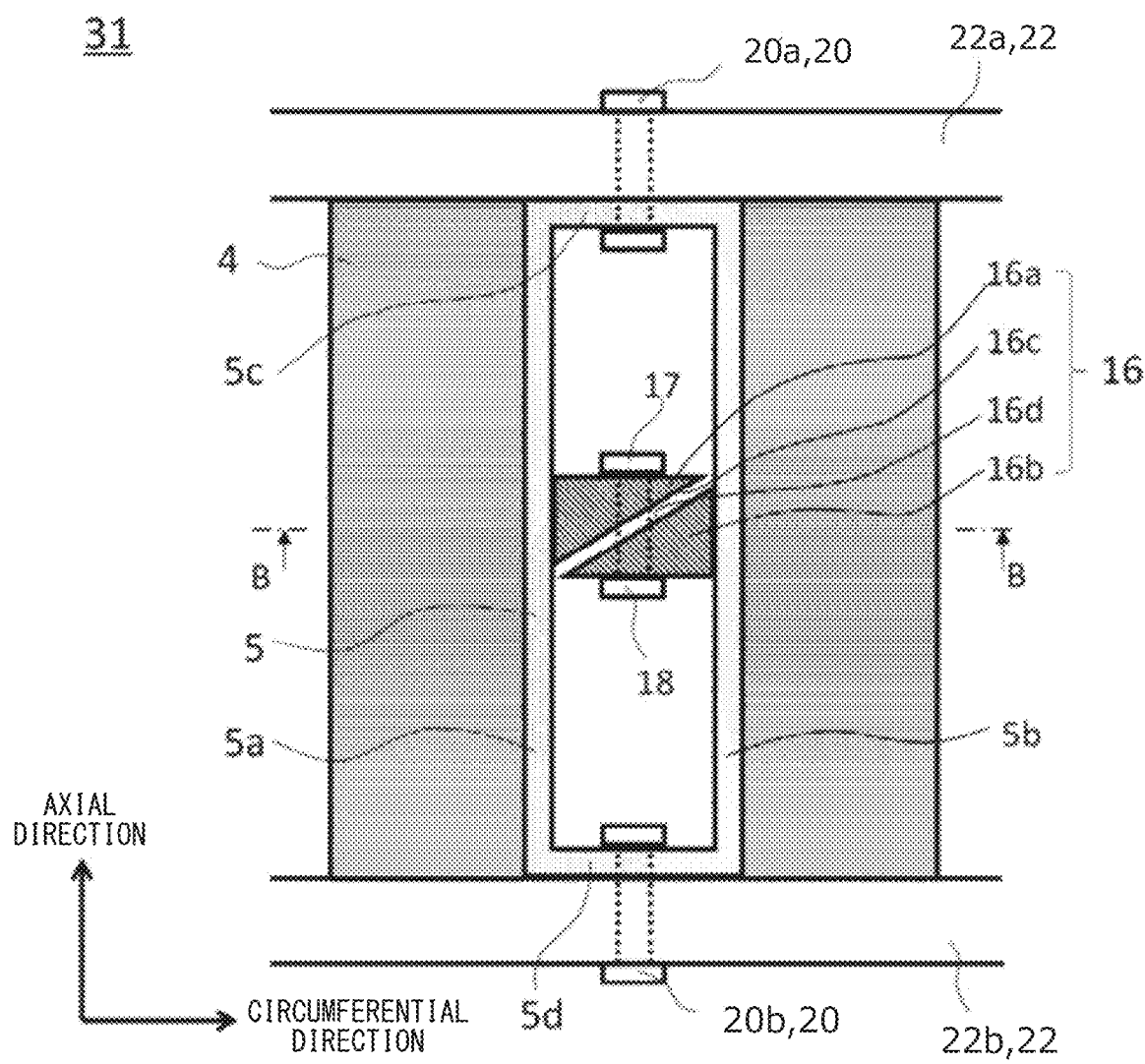
FIG. 7 is a side view of an intermediate cylindrical portion of a magnetic gear device or a rotating electrical machine according to embodiment 3 of the present disclosure, as seen in the radial direction.

FIG. 7 is a side view of a part of an intermediate cylindrical portion 31 of the magnetic gear device or the rotating electrical machine according to embodiment 3, as seen in the radial direction. The intermediate cylindrical portion 31 includes the magnetic-pole portions 4 and the spacers 5 arranged alternately in the circumferential direction, reinforcement portions 16 extending in the circumferential direction inside the spacer 5, and the two end plates 22 placed at both end portions in the axial direction of the magnetic-pole portions 4 and the spacers 5. The spacers 5 and the end plates 22 are joined by the joining members 20.

Difference from embodiment 1 is that, in the intermediate cylindrical portion 1 in embodiment 1, one block-shaped reinforcement portion 14 is placed inside each spacer 5, whereas in the intermediate cylindrical portion 31 in embodiment 3, the reinforcement portion 16 placed inside each spacer 5 is a pair of fastened reinforcement blocks having taper surfaces.

As shown in FIG. 7, in the intermediate cylindrical portion 31, the reinforcement portion 16 extending in the circumferential direction is placed inside each spacer 5. The reinforcement portion 16 includes a pair of a first reinforcement block 16a and a second reinforcement block 16b having taper surfaces. The reinforcement portion 16 is provided with a fastening member for fastening the first reinforcement block 16a and the second reinforcement block 16b.

The first reinforcement block 16a has a first taper surface 16c sloped relative to the axial direction, and the second reinforcement block 16b has a second taper surface 16d sloped relative to the axial direction. The first reinforcement block 16a and the second reinforcement block 16b are placed such that the first taper surface 16c and the second taper surface 16d are opposed to each other in the axial direction.

The first reinforcement block 16a and the second reinforcement block 16b are provided with through holes through which a bolt is inserted in the axial direction, and are fastened in the axial direction by a bolt 17 and a nut 18 which are fastening members such that the first taper surface 16c and the second taper surface 16d contact with each other. The through holes provided to the first reinforcement block 16a and the second reinforcement block 16b are formed to have larger diameters than that of the bolt 17 so as to have tolerances in positioning for fastening. Through bolt fastening, the opposed taper surfaces of the two reinforcement blocks slide on each other, and thus the reinforcement blocks are displaced relative to each other so as to mutually expand in the circumferential direction, thereby applying compressive forces in the circumferential direction to the adjacent magnetic-pole portions 4.

The widths in the circumferential direction of the first reinforcement block 16a and the second reinforcement block 16b can be made not greater than the width between the inner surfaces of the first side-wall portion 5a and the second side-wall portion 5b of the spacer 5.

When the fastening force for the bolt fastening the first reinforcement block 16a and the second reinforcement block 16b is increased, the reinforcement portion 16 expands in the circumferential direction, whereby the compressive forces in the circumferential direction to the magnetic-pole portions 4 can be strongly applied as compared to embodiment 1. For example, even in a case where it is difficult to press-fit the reinforcement portion into the spacer 5, the compressive forces in the circumferential direction can be strongly applied to the magnetic-pole portions 4.

In the axial direction, the reinforcement portion 16 is placed inside the frame of the spacer 5, with gaps from both end portions in the axial direction of the spacer 5. The first reinforcement block 16a placed on the first end portion 5c side of the spacer 5 is provided with a gap from the inner surface of the first end portion 5c. The second reinforcement block 16b placed on the second end portion 5d side of the spacer 5 is provided with a gap from the inner surface of the second end portion 5d.

Figure 8:
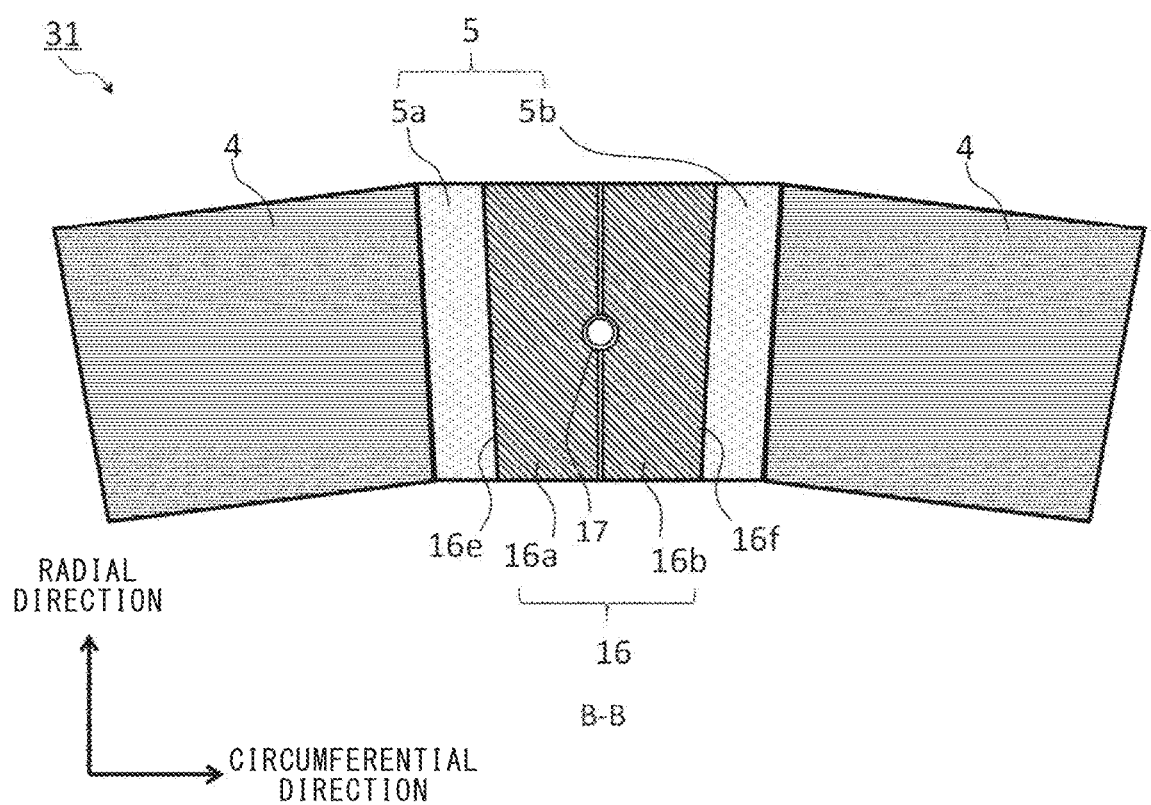
FIG. 8 is a sectional view of the intermediate cylindrical portion of the magnetic gear device and the rotating electrical machine according to embodiment 3 of the present disclosure, as seen in the axial direction.

FIG. 8 is a sectional view of the magnetic-pole portions 4, the spacer 5, and the reinforcement portion 16 of the intermediate cylindrical portion 31 as seen in the axial direction. In FIG. 8, a cross-section along line B-B in FIG. 7 is shown.

Also in the intermediate cylindrical portion 31, the spacer 5 and the reinforcement portion 16 formed by fastening the two reinforcement blocks each have a trapezoidal shape in which the width in the circumferential direction gradually increases toward the radially-outer side in the radial direction.

The first reinforcement block 16a of the reinforcement portion 16 has a first reinforcement-portion end surface 16e formed along the shape of the inner surface of the first side-wall portion 5a of the spacer 5, and the second reinforcement block 16b has a second reinforcement-portion end surface 16f formed along the shape of the inner surface of the second side-wall portion 5b of the spacer 5. Thus, the compressive forces in the circumferential direction can act uniformly on the magnetic-pole portion 4.

Also in embodiment 3, owing to joining between the spacers 5 and the end plates 22, the magnetic-pole portions 4 are subjected to compressive forces in the axial direction.

As described above, the magnetic-pole portions 4 are subjected to compressive forces in the axial direction and compressive forces in the circumferential direction, and the intermediate cylindrical portion 31 is formed in an approximately annular shape with all parts joined integrally. Thus, the intermediate cylindrical portion 31 has increased rigidity against external forces acting in the radial direction.

Next, an assembly procedure for the intermediate cylindrical portion 31 of embodiment 3 will be described. Difference from embodiment 1 is that the reinforcement portion 16 formed by fastening the pair of reinforcement blocks having the taper surfaces is placed inside the spacer 5.

The first reinforcement block 16a and the second reinforcement block 16b are placed inside the frame of the spacer 5 such that the taper surfaces of the first reinforcement block 16a and the second reinforcement block 16b face each other, the first reinforcement-portion end surface 16e of the first reinforcement block 16a is opposed to the inner surface of the first side-wall portion 5a of the spacer 5, and the second reinforcement-portion end surface 16f of the second reinforcement block 16b is opposed to the inner surface of the second side-wall portion 5b, and then the bolt is fastened to assemble the reinforcement portion 16.

The step of joining the other end plate 22 to the other ends of the spacers 5 may be performed after the first reinforcement block 16a and the second reinforcement block 16b are assembled as the reinforcement portion 16 inside each spacer 5. In the axial direction, there are gaps between the reinforcement portion 16 and the spacer 5, and therefore the reinforcement portion 16 does not influence joining between the spacer 5 and the end plate 22.

The materials used for the first reinforcement block 16a and the second reinforcement block 16b of the reinforcement portion 16 are nonmagnetic materials such as resin or stainless steel, so as not to obstruct a magnetic flux. It is desirable that nonmagnetic materials are used also for the bolt 17 and the nut 18 which are fastening members used for joining between the first reinforcement block 16a and the second reinforcement block 16b.

The magnetic gear device according to embodiment 3 provides the same effects as in embodiment 1. Further, in the intermediate cylindrical portion, the reinforcement portion placed inside the frame of the spacer expands in the circumferential direction by the fastening force between the pair of reinforcement blocks having the taper surfaces, whereby the compressive forces in the circumferential direction to the magnetic-pole portions can be more strongly applied as compared to embodiment 1.

The rotating electrical machine according to embodiment 3 provides the same effects as in embodiment 1. Further, in the intermediate cylindrical portion, the reinforcement portion placed inside the frame of the spacer expands in the circumferential direction by the fastening force between the pair of reinforcement blocks having the taper surfaces, whereby the compressive forces in the circumferential direction to the magnetic-pole portions can be more strongly applied as compared to embodiment 1.

Embodiment 4

In embodiment 4, the same components as those in embodiment 3 of the present disclosure are denoted by the same reference characters, and description of the same or corresponding parts is omitted. Hereinafter, with reference to the drawings, a magnetic gear device and a rotating electrical machine according to embodiment 4 will be described.

Figure 9:
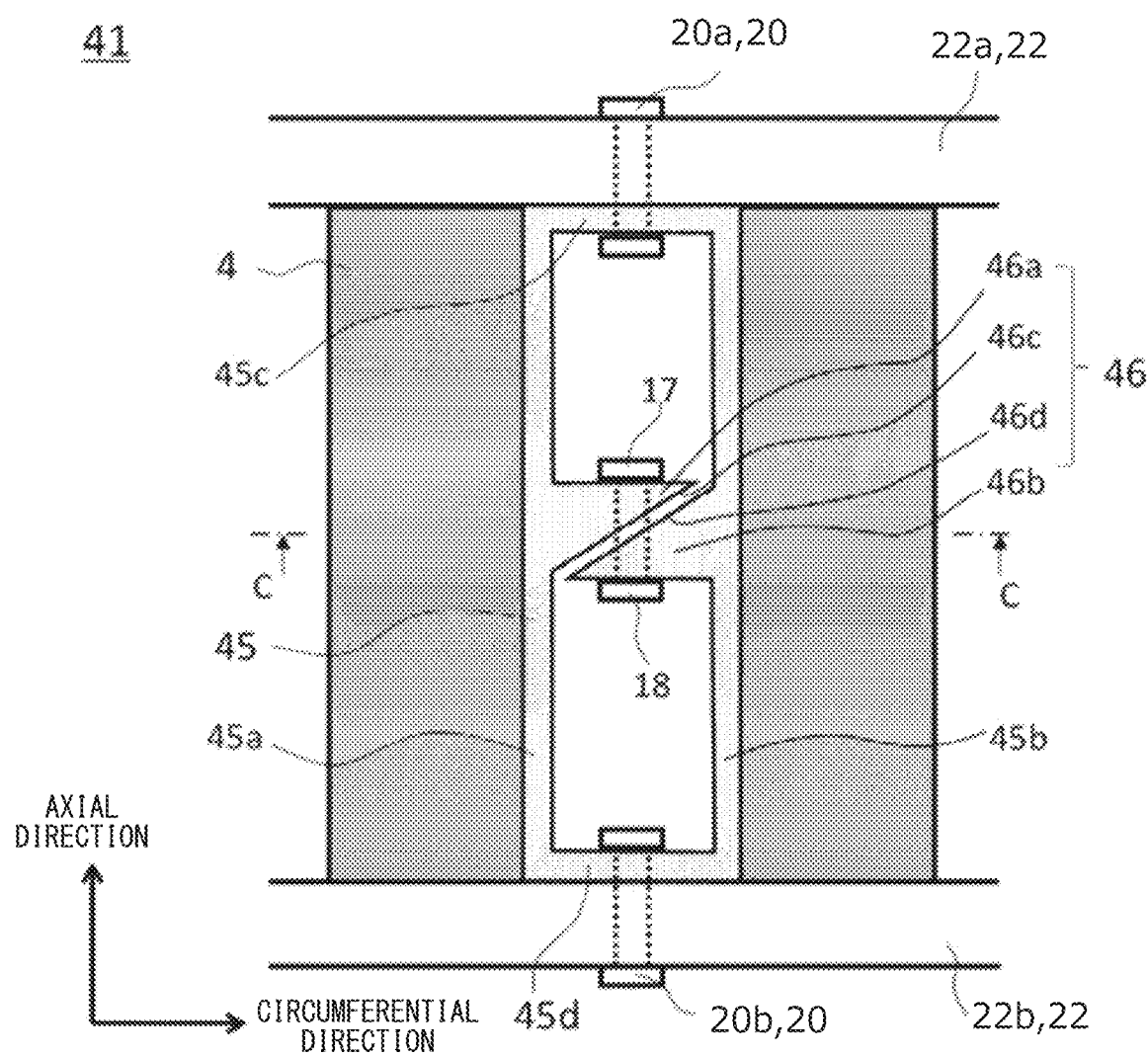
FIG. 9 is a side view of an intermediate cylindrical portion of a magnetic gear device or a rotating electrical machine according to embodiment 4 of the present disclosure, as seen in the radial direction.

FIG. 9 is a side view of a part of an intermediate cylindrical portion 41 of the magnetic gear device or the rotating electrical machine according to embodiment 4, as seen in the radial direction. The intermediate cylindrical portion 41 includes the magnetic-pole portions 4 and spacers 45 arranged alternately in the circumferential direction, reinforcement portions 46 provided in the circumferential direction inside the spacers 45, and two end plates 22 placed at both end portions in the axial direction of the magnetic-pole portions 4 and the spacers 45. The spacers 45 and the end plates 22 are joined by joining members 20.

In the intermediate cylindrical portion 31 of embodiment 3, the reinforcement portion 16 formed by fastening the pair of reinforcement blocks having the taper surfaces is placed inside the spacer 5. On the other hand, in the intermediate cylindrical portion 41 of embodiment 4, the reinforcement portion 46 extending in the circumferential direction inside the frame of the spacer 45 is formed by joining a pair of protrusions having taper surfaces and integrated with the spacer 45.

As shown in FIG. 9, the spacer 45 has therein a hollow extending in the radial direction and is formed in a rectangular frame shape as seen in the radial direction. The spacer 45 has two side-wall portions contacting with the magnetic-pole portions 4 on both sides in the circumferential direction, and two end portions contacting with the end plates 22 in the axial direction.

A first side-wall portion 45a and a second side-wall portion 45b which are the two side-wall portions of the spacer 45 are opposed to each other in the circumferential direction, and a first end portion 45c and a second end portion 45d which are the two end portions of the spacer 45 are opposed to each other in the axial direction, thus forming a rectangular frame shape of the spacer 45.

The reinforcement portion 46 has a first protrusion 46a protruding in the circumferential direction toward the second side-wall portion 45b from the first side-wall portion 45a, inside the spacer 45, and a second protrusion 46b protruding in the circumferential direction toward the first side-wall portion 45a from the second side-wall portion 45b, inside the spacer 45. In addition, the reinforcement portion 46 is provided with fastening members for fastening the first protrusion 46a and the second protrusion 46b.

The first protrusion 46a has a first taper surface 46c sloped relative to the axial direction, and the second protrusion 46b has a second taper surface 46d sloped relative to the axial direction. The first protrusion 46a and the second protrusion 46b are placed such that the first taper surface 46c and the second taper surface 46d are opposed to each other in the axial direction.

The first protrusion 46a and the second protrusion 46b are provided with through holes through which a bolt is inserted in the axial direction, and are fastened in the axial direction by a bolt 17 and a nut 18 which are fastening members such that the first taper surface 46c and the second taper surface 46d contact with each other. The through holes provided to the first protrusion 46a and the second protrusion 46b are formed to have larger diameters than that of the bolt 17 so as to have tolerances in positioning for fastening. By fastening the bolt 17 and the nut 18, the opposed taper surfaces of the two protrusions slide on each other, and thus the protrusions are displaced relative to each other so as to mutually expand in the circumferential direction, whereby the side-wall portions on both sides of the spacer 45 expand in the circumferential direction and compressive forces in the circumferential direction are applied to the adjacent magnetic-pole portions 4.

The first protrusion 46a and the second protrusion 46b of the reinforcement portion 46 are placed with gaps from both end portions in the axial direction of the spacer 45. Specifically, in the axial direction, the first protrusion 46a protruding from the first side-wall portion 45a is provided with a gap from the first end portion 45c. In addition, in the axial direction, the second protrusion 46b protruding from the second side-wall portion 45b is provided with a gap from the second end portion 45d.

Figure 10:
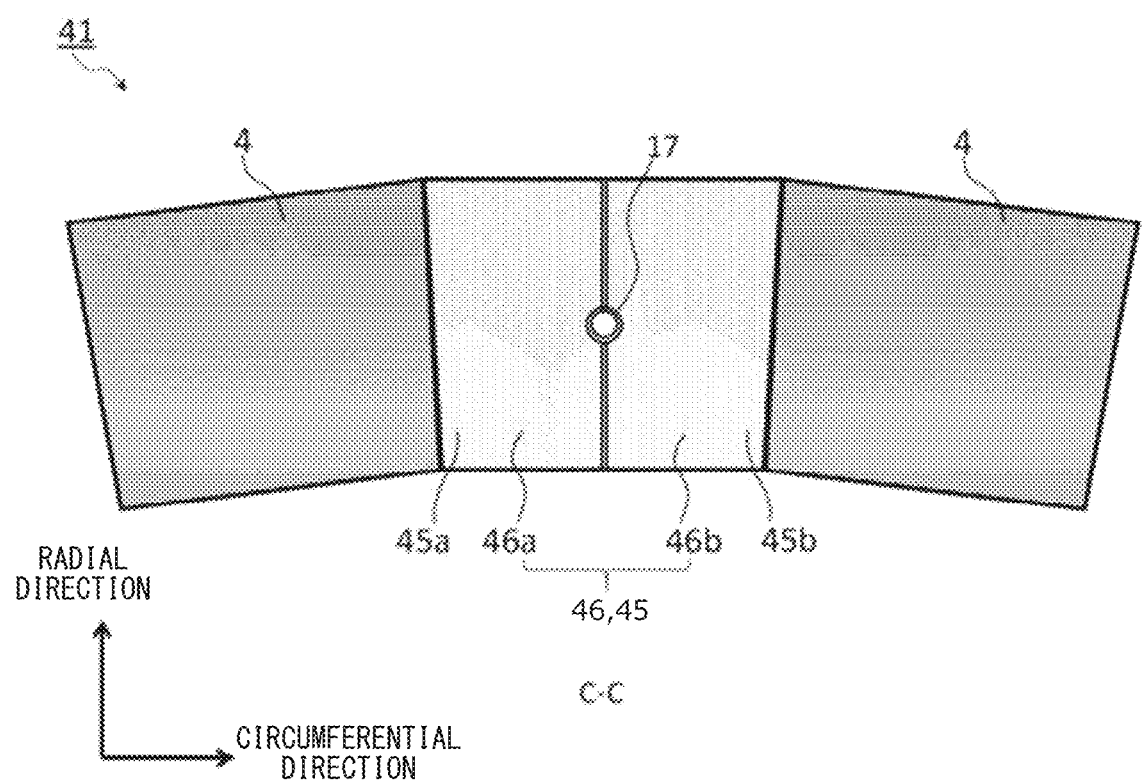
FIG. 10 is a sectional view of the intermediate cylindrical portion of the magnetic gear device and the rotating electrical machine according to embodiment 4 of the present disclosure, as seen in the axial direction.

FIG. 10 is a sectional view of the magnetic-pole portions 4 and the spacer 45 integrated with the reinforcement portion 46, of the intermediate cylindrical portion 41, as seen in the axial direction. In FIG. 10, a cross-section along line C-C in FIG. 9 is shown.

As shown in FIG. 10, since the spacer 45 and the reinforcement portion 46 are integrated with each other, the first side-wall portion 45a and the first protrusion 46a are contiguous to each other, and the second side-wall portion 45b and the second protrusion 46b are contiguous to each other.

Next, an assembly procedure for the intermediate cylindrical portion 41 of embodiment 4 will be described.

First, the end plate 22 is joined to ends on one side in the axial direction of all the spacers 45.

Next, the magnetic-pole portions 4 are placed between the adjacent spacers 45. At this time, the magnetic-pole portions 4 and the spacers 45 contact with each other without gaps in the circumferential direction, but contact pressures may or may not be generated between the contact surfaces of the magnetic-pole portions 4 and the spacers 45.

Next, in a state in which the spacers 45 are subjected to a tensile force, the other end plate 22 is joined to the other ends in the axial direction of all the spacers 45.

Next, the first protrusion 46a and the second protrusion 46b of each spacer 45 are fastened using the bolt 17 and the nut 18. The bolt 17 is fastened so as to apply the compressive forces in the circumferential direction to the adjacent magnetic-pole portions 4.

The step of joining the other end plate 22 to the other ends of the spacers 45 may be performed after the first protrusions 46a and the second protrusions 46b are joined by the bolts.

The material used for the spacer 45 is a nonmagnetic material such as resin or stainless steel, so as not to obstruct a magnetic flux. Each spacer 45 can be manufactured by molding so as to have an integrated structure having the pair of protrusions as the reinforcement portion.

The magnetic gear device according to embodiment 4 provides the same effects as in embodiment 3. Further, in the intermediate cylindrical portion of the magnetic gear device according to embodiment 4, the reinforcement portion and the spacer have an integrated structure, and therefore the number of components is smaller as compared to embodiment 3. In addition, since position-adjustment work at the time of placing the reinforcement portion in the spacer is not needed, assembly is easier as compared to embodiment 3. The rotating electrical machine according to embodiment 4 provides the same effects as in embodiment 3. Further, in the intermediate cylindrical portion of the rotating electrical machine according to embodiment 4, the reinforcement portion and the spacer have an integrated structure, and therefore the number of components is smaller as compared to embodiment 3. In addition, since position-adjustment work at the time of placing the reinforcement portion in the spacer is not needed, assembly is easier as compared to embodiment 3.

Embodiment 5

In embodiment 5, the same components as those in embodiment 3 of the present disclosure are denoted by the same reference characters, and description of the same or corresponding parts is omitted. Hereinafter, with reference to the drawings, a magnetic gear device and a rotating electrical machine according to embodiment 5 will be described.

Figure 11:
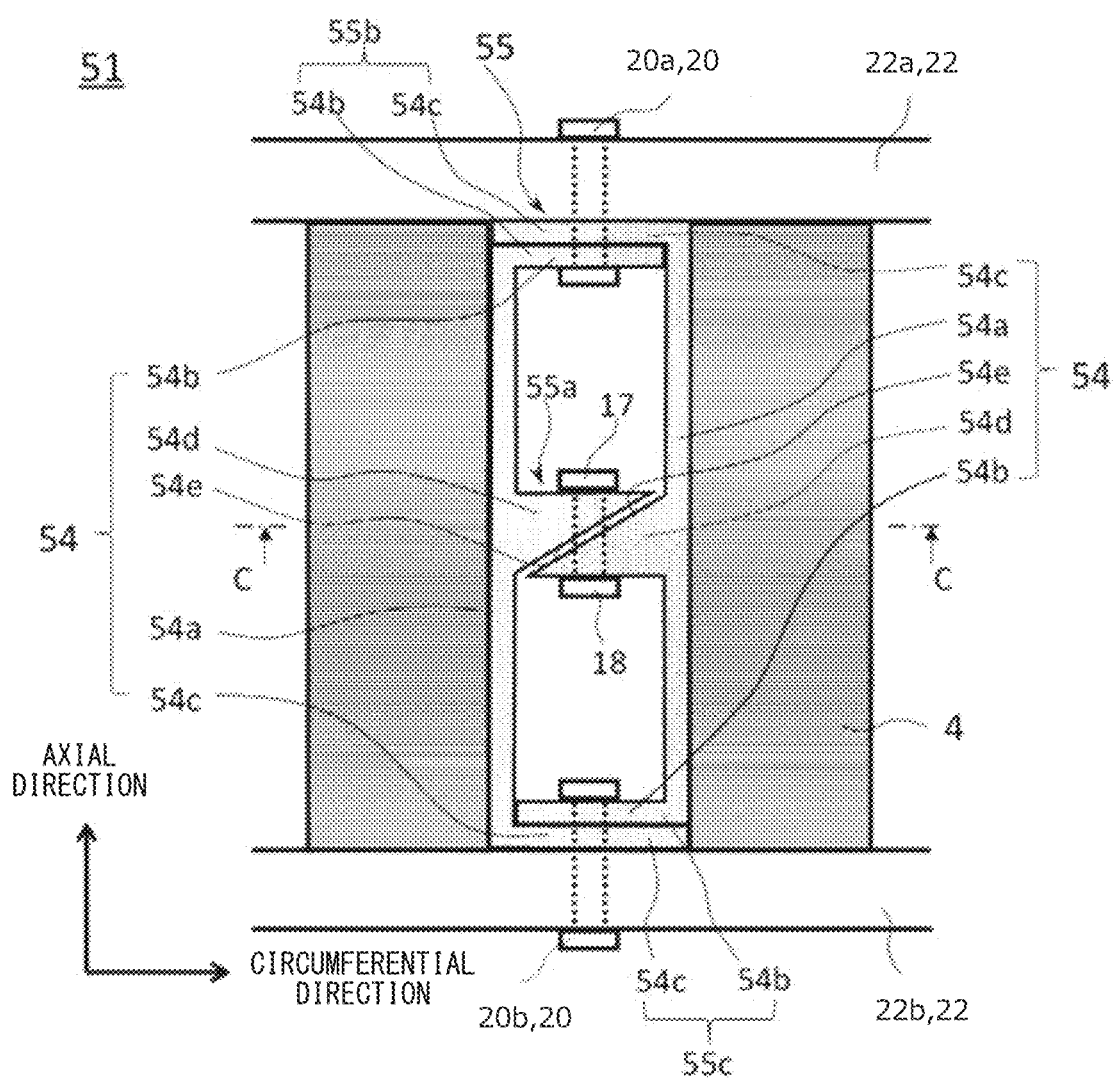
FIG. 11 is a side view of an intermediate cylindrical portion of a magnetic gear device or a rotating electrical machine according to embodiment 5 of the present disclosure, as seen in the radial direction.

FIG. 11 is a side view of a part of an intermediate cylindrical portion 51 of the magnetic gear device or the rotating electrical machine according to embodiment 5, as seen in the radial direction. The intermediate cylindrical portion 51 includes the magnetic-pole portions 4 and spacers 55 arranged alternately in the circumferential direction, reinforcement portions 55a provided in the circumferential direction inside the spacers 55, and the two end plates 22 placed at both end portions in the axial direction of the magnetic-pole portions 4 and the spacers 55. The spacers 55 and the end plates 22 are joined by the joining members 20.

In the intermediate cylindrical portion 31 of embodiment 3, the reinforcement portion 16 formed by fastening the pair of reinforcement blocks having the taper surfaces is placed inside the spacer 5. On the other hand, in the intermediate cylindrical portion 51 of embodiment 5, the spacer 55 is formed by placing a pair of spacer components 54 having identical shapes so as to be opposed to each other.

As shown in FIG. 11, each spacer component 54 has a spacer-component side-wall portion 54a extending in the axial direction, a first spacer-component end portion 54b and a second spacer-component end portion 54c protruding in the circumferential direction from both end portions in the axial direction of the spacer-component side-wall portion 54a, and a spacer-component protrusion 54d protruding in the circumferential direction from the spacer-component side-wall portion 54a, between the first spacer-component end portion 54b and the second spacer-component end portion 54c. The spacer-component protrusion 54d has a taper surface 54e sloped relative to the axial direction.

In the circumferential direction, the spacer-component protrusion 54d protrudes from the spacer-component side-wall portion 54a in the same direction as the first spacer-component end portion 54b and the second spacer-component end portion 54c. The spacer-component protrusion 54d is provided with a through hole through which a bolt is inserted in the axial direction.

The spacer 55 is placed such that, in the axial direction, the spacer-component protrusions 54d of the pair of spacer components 54 are fastened with their taper surfaces 54e opposed to each other and their respective first spacer-component end portions 54b and second spacer-component end portions 54c are overlapped so as to be opposed to each other.

The pair of spacer components 54 are fastened in the axial direction by a bolt 17 and a nut 18 which are fastening members in a state in which the taper surfaces 54e contact with each other.

In the spacer 55, two side-wall portions contacting with the magnetic-pole portions 4 on both sides in the circumferential direction are the pair of spacer-component side-wall portions 54a, and both end portions in the axial direction are formed such that the first spacer-component end portions 54b and the second spacer-component end portions 54c of the pair of spacer components 54 are overlapped with each other in the axial direction.

As shown in FIG. 11, at each of a first end portion 55b and a second end portion 55c which are both end portions in the axial direction of the spacer 55, the first spacer-component end portion 54b and the second spacer-component end portion 54c are overlapped so as to be located on the inner side and the outer side of the spacer 55, respectively.

In this way, the spacer-component side-wall portion 54a of the pair of spacer components 54 are opposed to each other in the circumferential direction, and the first end portion 55b and the second end portion 55c are opposed to each other in the axial direction, thus forming a rectangular frame shape of the spacer 55.

The first end portion 55b and the second end portion 55c are respectively joined to the end plates 22 at both ends in the axial direction.

The through holes provided to the spacer-component protrusions 54d are formed to have larger diameters than that of the bolt 17 so as to have tolerances in positioning for fastening. By fastening the bolt 17 and the nut 18, the opposed taper surfaces 54e of the pair of spacer-component protrusions 54d slide on each other, and thus the spacer-component protrusions 54d are displaced relative to each other so as to mutually expand in the circumferential direction, whereby the spacer-component side-wall portions 54a of the pair of spacer components 54 expand in the circumferential direction and compressive forces in the circumferential direction are applied to the adjacent magnetic-pole portions 4.

In the axial direction, the spacer-component protrusion 54d protruding from the spacer-component side-wall portion 54a of each spacer component 54 is located separately from the first spacer-component end portion 54b and the second spacer-component end portion 54c. In the spacer 55 assembled from the pair of spacer components 54, the reinforcement portion 55a is placed with gaps from the first end portion 55b and the second end portion 55c.

A sectional view of the magnetic-pole portions 4 and the spacer 55 of the intermediate cylindrical portion 51 as seen in the axial direction is the same as the sectional view shown in FIG. 10. The spacer 45 shown in FIG. 10 corresponds to the spacer 55 of the intermediate cylindrical portion 51. The reinforcement portion 46 shown in FIG. 10 corresponds to the reinforcement portion 55a of the intermediate cylindrical portion 51, and the first protrusion 46a and the second protrusion 46b correspond to the pair of spacer-component protrusions 54d.

Next, an assembly procedure for the intermediate cylindrical portion 51 of embodiment 5 will be described. First, the pair of spacer components 54 are placed such that, in the axial direction, the taper surfaces 54*e* of the spacer-component protrusions 54*d* are opposed to each other and their respective first spacer-component end portions 54*b* and second spacer-component end portions 54*c* are overlapped so as to be opposed to each other, and then are fastened in the axial direction by the bolt 17 and the nut 18 which are the fastening members in a state in which the pair of taper surfaces 54*e* contact with each other. Thus, the spacer 55 is assembled. At this time, the spacer components 54 may be fastened in a provisional fixed state so as to be loose in the axial direction. The pair of first spacer-component end portion 54*b* and second spacer-component end portion 54*c* form each of both end portions in the axial direction of the spacer 55.

Next, the end plate 22 is joined to ends on one side in the axial direction of all the spacers 55.

Next, the magnetic-pole portions 4 are each arranged between the adjacent spacers 55. At this time, the magnetic-pole portions 4 and the spacers 55 are arranged without gaps in the circumferential direction, but contact pressures may or may not be generated between the contact surfaces of the magnetic-pole portions 4 and the spacers 55.

Next, the other end plate 22 is joined to the other ends in the axial direction of all the spacers 55.

Next, the pair of spacer-component protrusions 54*d* are more strongly fastened than in the provisional fixed state. By strongly fastening the bolt 17, compressive forces in the circumferential direction are applied to the adjacent magnetic-pole portions 4. In addition, also in the axial direction, a tensile force is applied to each spacer 55, so that compressive forces in the axial direction are applied to the magnetic-pole portions 4.

The step of joining the other end plate 22 to the other ends in the axial direction of the spacers 55 may be performed after each pair of spacer-component protrusions 54*d* are more strongly fastened than in the provisional fastened state.

The material used for the spacer component 54 is a nonmagnetic material such as resin or stainless steel, so as not to obstruct a magnetic flux. The spacer component 54 having the spacer-component protrusion 54*d* integrally can be manufactured by molding.

The magnetic gear device according to embodiment 5 provides the same effects as in embodiment 3. In addition, in the intermediate cylindrical portion of the magnetic gear device according to embodiment 5, the reinforcement portion and the spacer are formed by the pair of spacer components, and therefore the number of components is smaller as compared to embodiment 3. In addition, the pair of spacer components have the same shape and therefore can be manufactured by molding, for example, whereby the manufacturing cost can be reduced.

The rotating electrical machine according to embodiment 5 provides the same effects as in embodiment 3. In addition, in the intermediate cylindrical portion of the rotating electrical machine according to embodiment 5, the reinforcement portion and the spacer are formed by the pair of spacer components, and therefore the number of components is smaller as compared to embodiment 3. In addition, the pair of spacer components have the same shape and therefore can be manufactured by molding, for example, whereby the manufacturing cost can be reduced.

Embodiment 6

In embodiment 6, the same components as those in embodiment 1 of the present disclosure are denoted by the same reference characters, and description of the same or corresponding parts is omitted. Hereinafter, with reference to the drawings, a magnetic gear device and a rotating electrical machine according to embodiment 6 will be described.

Figure 12:
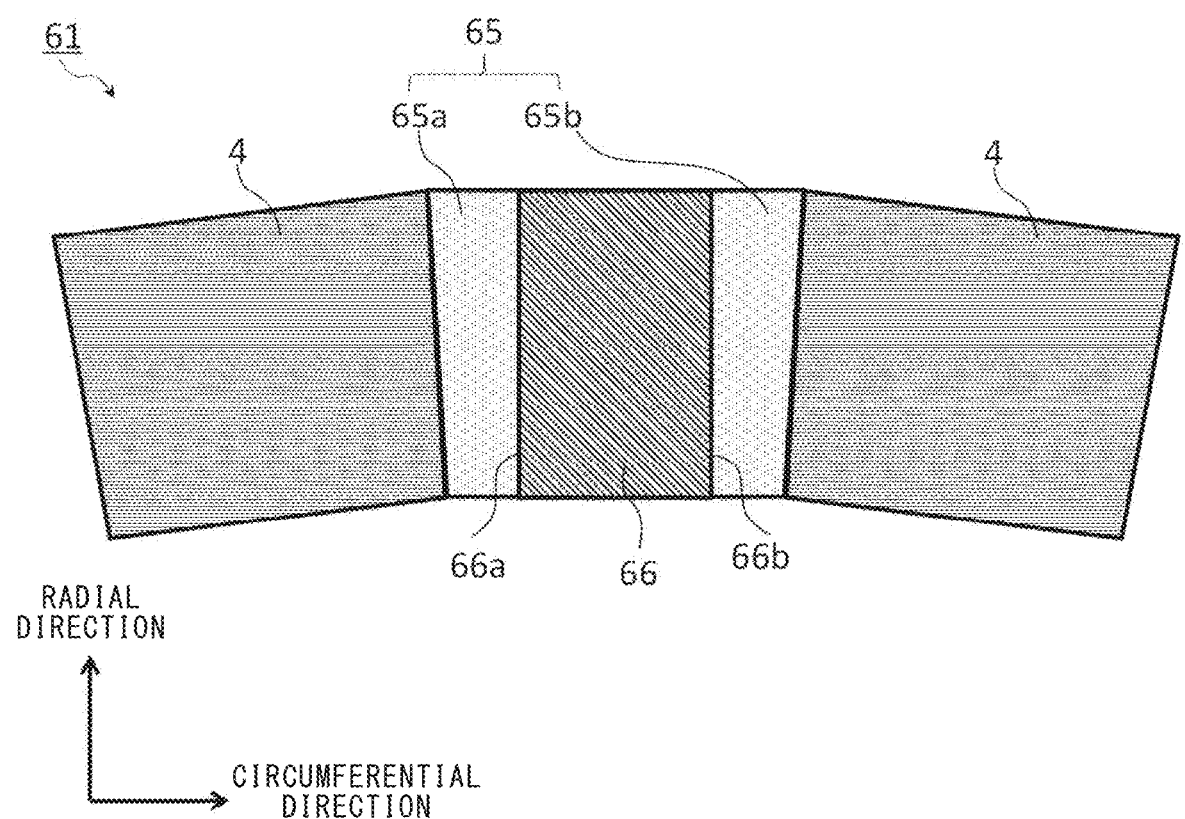
FIG. 12 is a sectional view of an intermediate cylindrical portion of a magnetic gear device and a rotating electrical machine according to embodiment 6 of the present disclosure, as seen in the axial direction.

FIG. 12 is a sectional view of a part of an intermediate cylindrical portion 61 of the magnetic gear device or the rotating electrical machine according to embodiment 6, as seen in the axial direction. The intermediate cylindrical portion 61 includes the magnetic-pole portions 4 and spacers 65 arranged alternately in the circumferential direction, and reinforcement portions 66 provided in the circumferential direction inside the spacers 65. The magnetic-pole portions 4 and the spacers 65 are arranged alternately without gaps in the circumferential direction.

As in embodiment 1, the intermediate cylindrical portion 61 is provided with two end plates 22 (not shown) placed at both end portions in the axial direction of the magnetic-pole portions 4 and the spacers 65. The spacers 65 and the end plates 22 are joined by joining members 20 (not shown).

In the intermediate cylindrical portion 1 of embodiment 1, as shown in FIG. 5, the cross-section of the reinforcement portion 14 placed inside the spacer 5 has a trapezoidal shape as seen in the axial direction. On the other hand, in the intermediate cylindrical portion 61 of embodiment 6, the cross-section of the reinforcement portion 66 placed inside the spacer 65 has a rectangular shape as seen in the axial direction. The width on the radially-inner side of the reinforcement portion 66 is the same as the width thereof on the radially-outer side.

As seen in the radial direction, the spacer 65 has a rectangular frame shape in which a hollow extending in the radial direction is formed, as in the spacer 5 of the intermediate cylindrical portion 1 of embodiment 1. The spacer 65 has two side-wall portions contacting with the magnetic-pole portions 4 on both sides in the circumferential direction, and two end portions contacting with the end plates 22 in the axial direction. A first side-wall portion 65*a* and a second side-wall portion 65*b* which are the two side-wall portions of the spacer 65 are opposed to each other in the circumferential direction, and two end portions (not shown) in the axial direction of the spacer 65 are opposed to each other, thus forming a rectangular frame shape of the spacer 65.

The reinforcement portion 66 is placed inside the spacer 65 such that a first reinforcement-portion end surface 66*a* and a second reinforcement-portion end surface 66*b* which are both end surfaces in the circumferential direction respectively contact with and along the inner surfaces of the first side-wall portion 65*a* and the second side-wall portion 65*b* on both sides in the circumferential direction of the spacer 65.

The reinforcement portion 66 contacts with the first side-wall portion 65*a* and the second side-wall portion 65*b* of the spacer 65 in the circumferential direction, thus applying compressive forces in the circumferential direction to the magnetic-pole portion 4 via the spacer 65. At this time, the reinforcement portion is subjected to reaction forces against the compressive forces. The directions of the reaction forces acting on the reinforcement portion 66 are the tangent direction of a circle about the rotation shaft. Since the cross-section of the reinforcement portion 66 as seen in the axial direction has a rectangular shape, the width thereof in the circumferential direction is the same from the radially-inner side to the radially-outer side. Thus, the reinforcement portion 66 can be prevented from moving to the radially-outer side, owing to an action of the reaction forces, as compared to a case where the cross-section has a trapezoidal shape in which the width in the circumferential direction gradually increases toward the radially-outer side.

The reinforcement portion 66 can have a structure similar to the block-shaped reinforcement portion in embodiments 1 and 2 or the pair of tapered reinforcement blocks fastened to each other in embodiment 3.

Even in a case where the reinforcement portion 66 is formed such that the cross-section of the block-shaped reinforcement portion in embodiments 1 and 2 or the pair of tapered reinforcement blocks fastened to each other in embodiment 3 has a rectangular shape, the effect of preventing the reinforcement portion 66 from moving to the radially-outer side is similarly obtained owing to an action of the reaction forces.

An assembly procedure for the intermediate cylindrical portion 61 of embodiment 6 is determined by the structure of the reinforcement portion as seen in the radial direction. For example, in the case of the block-shaped reinforcement portion in embodiment 1, the same assembly procedure as for the intermediate cylindrical portion 1 in embodiment 1 can be used.

The materials used for the spacer 65 and the reinforcement portion 66 are nonmagnetic materials such as resin or stainless steel, so as not to obstruct a magnetic flux.

The magnetic gear device according to embodiment 6 provides the same effects as in embodiment 1. Further, since the cross-section of the reinforcement portion as seen in the axial direction has a rectangular shape, as compared to a case where the cross-section has a trapezoidal shape, the reinforcement portion is prevented from moving to the radially-outer side, owing to an action of the reaction forces, whereby rigidity of the intermediate cylindrical portion can be ensured.

The rotating electrical machine according to embodiment 6 provides the same effects as in embodiment 1. Further, since the cross-section of the reinforcement portion as seen in the axial direction has a rectangular shape, as compared to a case where the cross-section has a trapezoidal shape, the reinforcement portion is prevented from moving to the radially-outer side, owing to an action of the reaction forces, whereby rigidity of the intermediate cylindrical portion can be ensured.

Embodiment 7

In embodiment 7, the same components as those in embodiment 1 of the present disclosure are denoted by the same reference characters, and description of the same or corresponding parts is omitted. Hereinafter, with reference to the drawings, a magnetic gear device and a rotating electrical machine according to embodiment 7 will be described.

Figure 13:
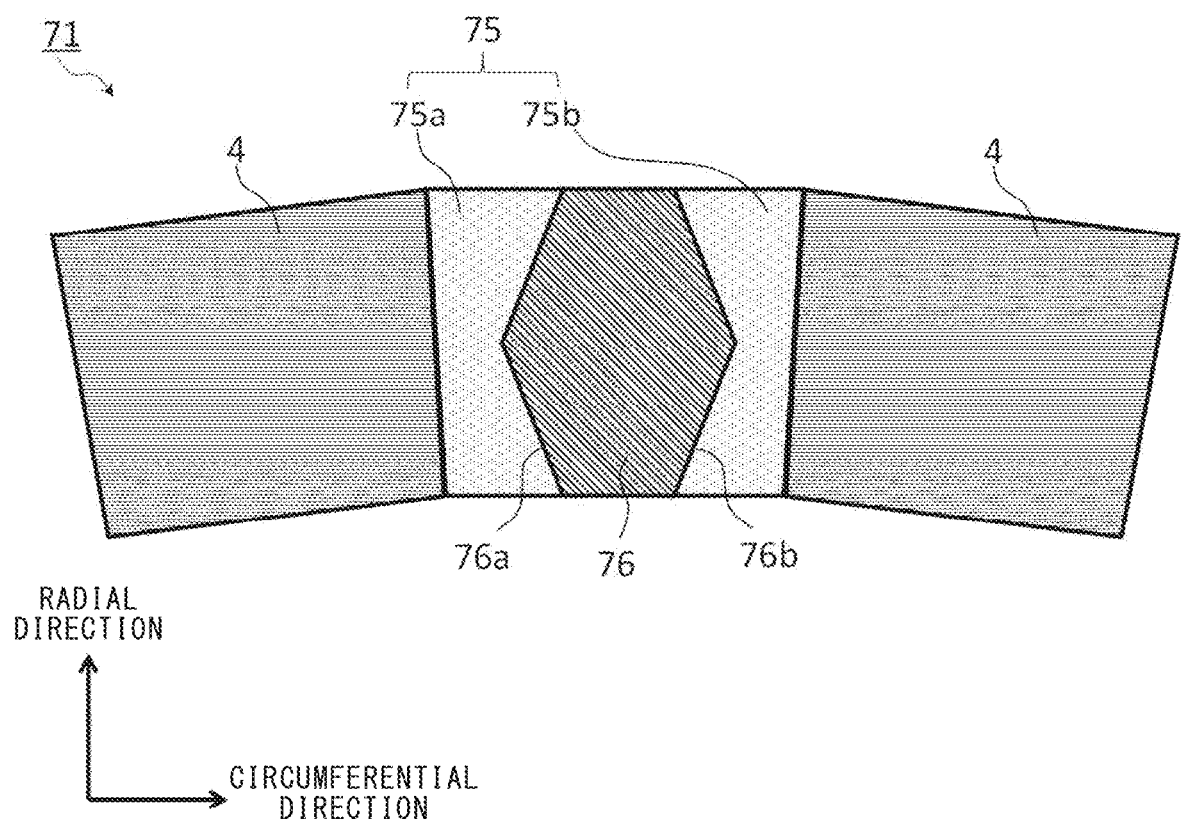
FIG. 13 is a sectional view of an intermediate cylindrical portion of a magnetic gear device and a rotating electrical machine according to embodiment 7 of the present disclosure, as seen in the axial direction.

FIG. 13 is a sectional view of a part of an intermediate cylindrical portion 71 of the magnetic gear device or the rotating electrical machine according to embodiment 7, as seen in the axial direction. The intermediate cylindrical portion 71 includes the magnetic-pole portions 4 and spacers 75 arranged alternately in the circumferential direction, and reinforcement portions 76 provided in the circumferential direction inside the spacers 75. The magnetic-pole portions 4 and the spacers 75 are arranged alternately without gaps in the circumferential direction. As in embodiment 1, the intermediate cylindrical portion 71 is provided with two end plates 22 placed at both end portions in the axial direction of the magnetic-pole portions 4 and the spacers 75.

In the intermediate cylindrical portion 1 of embodiment 1, as shown in FIG. 5, the cross-section of the reinforcement portion 14 placed inside the spacer 5 has a trapezoidal shape as seen in the axial direction. On the other hand, in the intermediate cylindrical portion 71 of embodiment 7, the cross-section of the reinforcement portion 76 placed inside the spacer 75 as seen in the axial direction is such that the contact surfaces of the spacer 75 and the reinforcement portion 76 have recess and projection shapes. That is, the inner surfaces of the side-wall portions of the spacer 75 and the end surfaces in the circumferential direction of the reinforcement portion 76 respectively have recess and projection shapes and are recess-projection engaged with each other.

As seen in the radial direction, the spacer 75 has a rectangular frame shape in which a hollow extending in the radial direction is formed, as in the spacer 5 of the intermediate cylindrical portion 1 of embodiment 1.

As shown in FIG. 13, the inner surfaces of a first side-wall portion 75a and a second side-wall portion 75b on both sides in the circumferential direction of the spacer 75 are formed to be recessed in V shapes in the circumferential direction relative to the reinforcement portion 76. A first reinforcement-portion end surface 76a and a second reinforcement-portion end surface 76b which are both end surfaces in the circumferential direction of the reinforcement portion 76 are formed in V shapes protruding toward both sides in the circumferential direction of the spacer 75. The reinforcement portion 76 is placed inside the spacer 75 such that the inner surfaces of the first side-wall portion 75a and the second side-wall portion 75b of the spacer 75, and the first reinforcement-portion end surface 76a and the second reinforcement-portion end surface 76b of the reinforcement portion 76, are recess-projection engaged with each other.

The reinforcement portion 76 contacts with the first side-wall portion 75a and the second side-wall portion 75b of the spacer 75 in the circumferential direction, thereby applying compressive forces in the circumferential direction to the magnetic-pole portions 4. At this time, the reinforcement portion is subjected to reaction forces against the compressive forces in the circumferential direction. In the intermediate cylindrical portion 71, since the contact surfaces of the reinforcement portion 76 and the spacer 75 have recess and projection shapes, the reinforcement portion 76 is prevented from moving to the radially-inner side or the radially-outer side in the radial direction, owing to an action of the reaction forces, whereby rigidity of the intermediate cylindrical portion 71 can be ensured.

In the sectional view of the reinforcement portion 76 as seen in the axial direction shown in FIG. 13, the widths on the radially-inner side and the radially-outer side of the reinforcement portion 76 are smaller than the width thereof between the radially-inner side and the radially-outer side. However, the axial-direction sectional shape of the reinforcement portion 76 is not limited thereto. As long as the reinforcement portion has such a shape that the reinforcement portion can be placed in the spacer and the contact surfaces of the reinforcement portion and the spacer have recess and projection shapes, the reinforcement portion can be prevented from moving to the radially-inner side or the radially-outer side in the radial direction, owing to an action of the reaction forces.

The reinforcement portion 76 can be made similar to the block-shaped reinforcement portion in embodiments 1 and 2 or the pair of tapered reinforcement blocks fastened to each other in embodiment 3, whereby the effect of preventing radial-direction movement of the reinforcement portion 66 is similarly obtained owing to an action of the reaction forces.

An assembly procedure for the intermediate cylindrical portion 71 of embodiment 7 is determined by the structure of the reinforcement portion as seen in the radial direction. For example, in a case where the cross-section of the block-shaped reinforcement portion of embodiment 1 as seen in the axial direction has the sectional shape shown in FIG. 13, at the time of placing the reinforcement portion 76 inside the spacer 75, the reinforcement portion 76 is inserted into the frame of the spacer 75 with the circumferential direction of the reinforcement portion 76 along the axial direction of the spacer 75, and then the reinforcement portion 76 is rotated by 90 degrees, so that the first reinforcement-portion end surface 76a of the reinforcement portion 76 and the first side-wall portion 75a of the spacer 75 contact with each other and the second reinforcement-portion end surface 76b and the second side-wall portion 75b contact with each other. Thus, the reinforcement portion 76 is placed inside the frame of the spacer 75 such that compressive forces in the circumferential direction are applied.

The materials used for the spacer 75 and the reinforcement portion 76 are nonmagnetic materials such as resin or stainless steel, so as not to obstruct a magnetic flux.

The magnetic gear device according to embodiment 7 provides the same effects as in embodiment 1. Further, since the reinforcement portion is placed inside the spacer such that the reinforcement portion and the spacer are recess-projection engaged with each other, radial-direction movement of the reinforcement portion is prevented owing to an action of the reaction forces, whereby rigidity of the intermediate cylindrical portion can be ensured.

The rotating electrical machine according to embodiment 7 provides the same effects as in embodiment 1. Further, since the reinforcement portion is placed inside the spacer such that the reinforcement portion and the spacer are recess-projection engaged with each other, radial-direction movement of the reinforcement portion is prevented owing to an action of the reaction forces, whereby rigidity of the intermediate cylindrical portion can be ensured.

The configurations described in the above embodiments are examples of features of the present disclosure. These configurations may be combined with other known configurations or may be partially omitted or changed without deviating from the scope of the present disclosure.

DESCRIPTION OF THE REFERENCE CHARACTERS 1, 21, 31, 41, 51, 61, 71 intermediate cylindrical portion
2 inner cylindrical portion
3 outer cylindrical portion of magnetic gear device
4 magnetic-pole portion
5, 45, 55, 65, 75 spacer
6 inner-cylindrical-portion core
7 inner-cylindrical-portion magnet
8 outer-cylindrical-portion magnet
9 outer-cylindrical-portion core
10 magnetic gear device
11 outer-cylindrical-portion core
11a core tooth portion
12 outer-cylindrical-portion coil
13 outer cylindrical portion of rotating electrical machine
14, 15, 16, 46, 55a, 66, 76 reinforcement portion
17 bolt
18 nut
20 joining member
22 end plate
100 rotating electrical machine
101 rotary shaft

The invention claimed is:

1. A magnetic gear device comprising:
an inner cylindrical portion having a cylindrical shape;
an outer cylindrical portion having a cylindrical shape, and provided on a radially-outer side of the inner cylindrical portion and concentrically around a rotary shaft; and
an intermediate cylindrical portion having a cylindrical shape, and provided concentrically around the rotary shaft, between the inner cylindrical portion and the outer cylindrical portion, wherein
the inner cylindrical portion and the outer cylindrical portion serve as rotors,
the intermediate cylindrical portion includes
a plurality of magnetic-pole portions arranged in a circumferential direction,
spacers having a frame shape and arranged in the circumferential direction alternately with the magnetic-pole portions, each spacer having side-wall portions contacting with the adjacent magnetic-pole portions,
end plates provided at both ends of the magnetic-pole portions and the spacers in an axial direction of the rotary shaft, and
reinforcement portions placed inside the spacers in a state in which each reinforcement portion is pressed to inner surfaces of the side-wall portions in the circumferential direction, so as to apply forces in the circumferential direction to the adjacent magnetic-pole portions via the spacer,
the reinforcement portions are placed with gaps from both end portions in the axial direction of the spacers, and
a length in the axial direction of each spacer is smaller than that of the magnetic-pole portion, and both end portions in the axial direction of each spacer are fixed to the end plates in a state in which each spacer is subjected to a tensile force in the axial direction.

2. The magnetic gear device according to claim 1, wherein a plurality of the reinforcement portions are placed in the axial direction inside each spacer.

3. The magnetic gear device according to claim 1, wherein the reinforcement portions are formed by placing, inside the spacers, a reinforcement component whose width in the circumferential direction is greater than a width between the inner surfaces of the spacers.

4. The magnetic gear device according to claim 1, wherein each reinforcement portion is a pair of reinforcement blocks having taper surfaces sloped relative to the axial direction, and fastened in the axial direction by a fastening member in a state in which the taper surfaces are opposed to and contact with each other.

5. The magnetic gear device according to claim 1, wherein each reinforcement portion is a pair of protrusions integrated with a respective one of the spacers, the protrusions protruding from the inner surfaces of the respective spacer and having taper surfaces sloped relative to the axial direction, and
the pair of protrusions of each reinforcement portion are fastened in the axial direction by a fastening member in a state in which the taper surfaces are opposed to and contact with each other.

6. The magnetic gear device according to claim 1, wherein the spacers and the reinforcement portions are formed by placing a pair of spacer components having identical shapes so as to be opposed to each other,
each spacer component has:
  a spacer-component side-wall portion extending in the axial direction,
  a first spacer-component end portion and a second spacer-component end portion protruding in the circumferential direction from both ends in the axial direction of the spacer-component side-wall portion, and
  a spacer-component protrusion protruding in the circumferential direction from the spacer-component side-wall portion, between the first spacer-component end portion and the second spacer-component end portion, and having a taper surface sloped relative to the axial direction,
each reinforcement portion is a pair of the spacer-component protrusions fastened in the axial direction by a fastening member in a state in which the taper surfaces are opposed to and contact with each other in the pair of spacer components, and
the two side-wall portions of each spacer are a pair of the spacer-component side-wall portions, and both end portions in the axial direction of the spacer are formed such that the respective first spacer-component end portions and the respective second spacer-component end portions of the pair of spacer components are overlapped with each other in the axial direction.

7. The magnetic gear device according to claim 1, wherein each reinforcement portion has a trapezoidal shape in which a width in the circumferential direction thereof gradually increases toward a radially-outer side.

8. The magnetic gear device according to claim 1, wherein a cross-section of each reinforcement portion as seen in the axial direction has a rectangular shape.

9. The magnetic gear device according to claim 1, wherein the inner surfaces of the side-wall portions of each spacer and end surfaces in the circumferential direction of each reinforcement portion respectively have recess and projection shapes and are recess-projection engaged with each other.

10. A rotating electrical machine comprising:
an inner cylindrical portion having a cylindrical shape;
an outer cylindrical portion having a cylindrical shape, and provided on a radially-outer side of the inner cylindrical portion and concentrically around a rotary shaft; and
an intermediate cylindrical portion provided concentrically around the rotary shaft, between the inner cylindrical portion and the outer cylindrical portion, wherein
the inner cylindrical portion serves as a rotor,
the outer cylindrical portion serves as a winding-type stator having a plurality of coils,
the intermediate cylindrical portion includes
  a plurality of magnetic-pole portions arranged in a circumferential direction,
  spacers having a frame shape and arranged in the circumferential direction alternately with the magnetic-pole portions, each spacer having side-wall portions contacting with the adjacent magnetic-pole portions,
  end plates provided at both ends of the magnetic-pole portions and the spacers in an axial direction of the rotary shaft, and
  reinforcement portions placed inside the spacers in a state in which each reinforcement portion is pressed to inner surfaces of the side-wall portions in the circumferential direction, so as to apply forces in the circumferential direction to the adjacent magnetic-pole portions via the spacer,
the reinforcement portions are placed with gaps from both end portions in the axial direction of the spacers, and
a length in the axial direction of each spacer is smaller than that of the magnetic-pole portion, and both end portions in the axial direction of each spacer are fixed to the end plates in a state in which each spacer is subjected to a tensile force in the axial direction.

11. The rotating electrical machine according to claim 10, wherein
a plurality of the reinforcement portions are placed in the axial direction inside each spacer.

12. The rotating electrical machine according to claim 10, wherein
the reinforcement portions are formed by placing, inside the spacers, a reinforcement component whose width in the circumferential direction is greater than a width between the inner surfaces of the spacers.

13. The rotating electrical machine according to claim 10, wherein
each reinforcement portion is a pair of reinforcement blocks having taper surfaces sloped relative to the axial direction, and fastened in the axial direction by a fastening member in a state in which the taper surfaces are opposed to and contact with each other.

14. The rotating electrical machine according to claim 10, wherein
each reinforcement portion is a pair of protrusions integrated with a respective one of the spacers, the protrusions protruding from the inner surfaces of the respective spacer and having taper surfaces sloped relative to the axial direction, and
the pair of protrusions are fastened in the axial direction by a fastening member in a state in which the taper surfaces are opposed to and contact with each other.

15. The rotating electrical machine according to claim 10, wherein
the spacers and the reinforcement portions are formed by placing a pair of spacer components having identical shapes so as to be opposed to each other,
each spacer component has:
  a spacer-component side-wall portion extending in the axial direction,
  a first spacer-component end portion and a second spacer-component end portion protruding in the circumferential direction from both ends in the axial direction of the spacer-component side-wall portion, and
  a spacer-component protrusion protruding in the circumferential direction from the spacer-component side-wall portion, between the first spacer-component end portion and the second spacer-component end portion, and having a taper surface sloped relative to the axial direction,
each reinforcement portion is a pair of the spacer-component protrusions fastened in the axial direction by a fastening member in a state in which the taper surfaces are opposed to and contact with each other in the pair of spacer components, and
the two side-wall portions of each spacer are a pair of the spacer-component side-wall portions, and both end portions in the axial direction of the spacer are formed such that the respective first spacer-component end portions and the respective second spacer-component end portions of the pair of spacer components are overlapped with each other in the axial direction.

16. The rotating electrical machine according to claim 10, wherein
each reinforcement portion has a trapezoidal shape in which a width in the circumferential direction thereof gradually increases toward a radially-outer side.

17. The rotating electrical machine according to claim 10, wherein
a cross-section of each reinforcement portion as seen in the axial direction has a rectangular shape.

18. The rotating electrical machine according to claim 10, wherein
the inner surfaces of the side-wall portions of each spacer and end surfaces in the circumferential direction of each reinforcement portion respectively have recess and projection shapes and are recess-projection engaged with each other.

* * * * *